(12) United States Patent
Kato

(10) Patent No.: US 8,168,734 B2
(45) Date of Patent: May 1, 2012

(54) LATERAL ALPHA-SUBSTITUTED ACRYLATE COMPOUND AND POLYMER THEREOF

(75) Inventor: Takashi Kato, Ichihara (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 13/033,318

(22) Filed: Feb. 23, 2011

(65) Prior Publication Data

US 2011/0144293 A1    Jun. 16, 2011

Related U.S. Application Data

(62) Division of application No. 11/634,927, filed on Dec. 7, 2006, now Pat. No. 7,919,648.

(30) Foreign Application Priority Data

Dec. 8, 2005 (JP) ................. 2005-355180

(51) Int. Cl.
C08F 114/18 (2006.01)
C07C 69/76 (2006.01)
C09K 19/20 (2006.01)

(52) U.S. Cl. ........ 526/246; 428/1.1; 428/1.31; 349/167; 349/193; 544/224; 544/330; 546/341; 558/16; 558/410; 560/138; 560/142; 560/144; 560/181; 526/242; 526/243; 526/245; 252/299.01; 252/299.67

(58) Field of Classification Search .................. None
See application file for complete search history.

(56) References Cited

U.S. PATENT DOCUMENTS

| | | | |
|---|---|---|---|
| 4,297,466 A | 10/1981 | Bloch | |
| 4,323,695 A | 4/1982 | Bloch | |
| 4,615,584 A | 10/1986 | Ohmori | |
| 4,720,166 A | 1/1988 | Ohmori | |
| 4,836,642 A | 6/1989 | Matsumoto | |
| 5,072,030 A | 12/1991 | Bielefeldt | |
| 5,087,672 A | 2/1992 | Babirad | |
| 5,187,769 A | 2/1993 | Groh | |
| 5,198,925 A | 3/1993 | Heumuller | |
| 5,239,027 A | 8/1993 | Groh | |
| 5,833,880 A | 11/1998 | Siemensmeyer | |
| 6,018,008 A | 1/2000 | Stacey | |
| 6,982,287 B2 | 1/2006 | Wang | |
| 7,083,834 B2 | 8/2006 | Kuntz | |
| 7,101,595 B2 | 9/2006 | Shundo | |
| 7,357,964 B2 | 4/2008 | Inoue | |
| 2004/0147756 A1 | 7/2004 | Miyata | |
| 2006/0134350 A1 | 6/2006 | Hirai | |
| 2007/0134440 A1 | 6/2007 | Kato | |

FOREIGN PATENT DOCUMENTS

| | | | |
|---|---|---|---|
| EP | 0 220 463 A2 | 5/1987 | |
| EP | 0 254 865 A2 | 2/1988 | |
| EP | 1 046 631 A1 | 10/2000 | |
| EP | 1 070 731 A1 | 1/2001 | |
| JP | 05-310840 | 11/1993 | |
| JP | 07-017910 | 1/1995 | |
| JP | 08-003111 A | 1/1996 | |
| JP | 09-316032 | 12/1997 | |
| JP | 10-120729 A | 5/1998 | |
| JP | 2001-302611 A | 10/2001 | |
| JP | 2004-323729 A | 11/2004 | |
| JP | 2005-023019 | 1/2005 | |
| JP | 2005-015473 A | 2/2005 | |

(Continued)

OTHER PUBLICATIONS

Fuchikami et al., Facile syntheses of flourine-containing alpha.beta. unsaturated acids and esters from 2-trifluiromethylacrylic acid, Tetrahedron Letters, 1986, 27(27), 3165-3168. CAPLUS abstract.

(Continued)

*Primary Examiner* — Rosalynd Keys
(74) *Attorney, Agent, or Firm* — Hogan Lovells US LLP

(57) ABSTRACT

The invention relates to compounds represented by Formula (1):

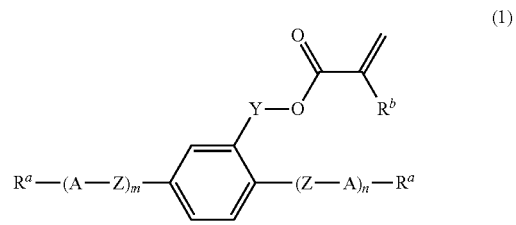

wherein $R^a$ is independently halogen, cyano, —$CF_3$, —$CF_2H$, —$CFH_2$, —$OCF_3$, —$OCF_2H$, —N=C=O, —N=C=S or alkyl having a carbon number of approximately 1 to approximately 20; in the alkyl, optional —$CH_2$— may be substituted with —O—, —S—, —$SO_2$—, —CO—, —COO—, —OCO—, —CH=CH—, —CF=CF— or —C≡C—, and optional hydrogen may be substituted with halogen; $R^b$ is fluorine or —$CF_3$; A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —$CH_2$— may be substituted with —O—, optional —CH=may be substituted with —N=, and optional hydrogen may be substituted with halogen, alkyl having a carbon number of approximately 1 to approximately 5 or halogenated alkyl having a carbon number of approximately 1 to approximately 5; Z is independently a single bond or alkylene having a carbon number of approximately 1 to approximately 20; in the alkylene, optional —$CH_2$— may be substituted with —O—, —CO—, —COO—, —OCO—, —CH=CH—, —CF=CF— or —C≡C—, and optional hydrogen may be substituted with halogen; Y is a single bond or alkylene having a carbon number of approximately 1 to approximately 20; in the alkylene, optional —$CH_2$— may be substituted with —O—, —CO—, —COO—, —OCO— or —CH=CH—, and optional hydrogen may be substituted with halogen; and m and n are each an integer of approximately 0 to approximately 5, wherein m and n are not 0 at the same time.

10 Claims, No Drawings

FOREIGN PATENT DOCUMENTS

| | | |
|---|---|---|
| JP | 2005-179557 | 7/2005 |
| JP | 2005-281171 A | 10/2005 |
| JP | 2005-325042 A | 11/2005 |
| JP | 2006-265527 | 10/2006 |
| WO | 00/59966 | 10/2000 |
| WO | 00/63154 | 10/2000 |

OTHER PUBLICATIONS

Fuchikami et al., Facile synthesis of fluorine-containing alpha-beta-unsaturated acids and esters from 2-trifluoromethylacrylic acid, Tetrahedron Letters, 1986, vol. 27, pp. 3173-3176.

Marhold et al., Synthesis of vinyl fluorides by ring-closing metathesis, Tetrahedron Letters, 2004, vol. 45, pp. 57-60.

LATERAL ALPHA-SUBSTITUTED ACRYLATE COMPOUND AND POLYMER THEREOF

CROSS REFERENCE TO RELATED APPLICATIONS

This application is a Divisional of U.S. application Ser. No. 11/634,927, filed on Dec. 7, 2006; now U.S. Pat. No. 7,919,648, dated Apr. 5, 2011; which claims priority under 35 U.S.C. §119 to Japanese Patent Application No. JP 2005-355180, filed Dec. 8, 2005, which applications are expressly incorporated herein by reference in their entirety.

BACKGROUND OF THE INVENTION

1. Field of the Invention

The invention relates to a compound in which a chain group having α-substituted acryloyloxy is substituted on a 1,4-phenylene ring, a composition containing the compound, a polymer of the compound and applications thereof.

2. Description of the Related Art

A polymer in which a molecular configuration is fixed is obtained by aligning the molecules of a polymerizable compound having a liquid crystallinity in a fixed direction and photopolymerizing it. It is known that such polymer has an optical anisotropy (see, e.g., JP H8-3111 A11996). The polymerizable compound having a liquid crystallinity includes, for example, the acrylates shown below (see, e.g., JP H7-17910 A/1995 and JP H7-316032 A11997). These acrylates have a high reactivity and provide polymers having a high transparency, but they are further required to be improved in characteristics such as a heat resistance and a mechanical strength.

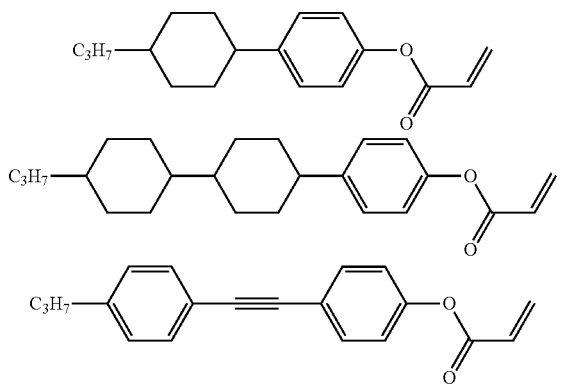

SUMMARY OF THE INVENTION

The invention relates to a compound represented by Formula (1):

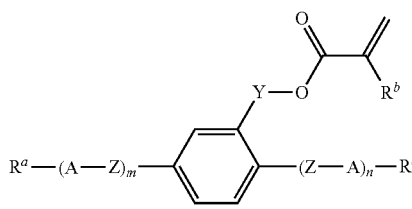

wherein in Formula (1), $R^a$ is independently hydrogen, halogen, cyano, $-CF_3$, $-CF_2H$, $-CFH_2$, $-OCF_3$, $-OCF_2H$, $-N=C=O$, $-N=C=S$ or alkyl having a carbon number of approximately 1 to approximately 20; in the alkyl, optional $-CH_2-$ may be substituted with $-O-$, $-S-$, $-SO_2-$, $-CO-$, $-COO-$, $-OCO-$, $-CH=CH-$, $-CF=CF-$ or $-C\equiv C-$, and optional hydrogen may be substituted with halogen; $R^b$ is fluorine or $-CF_3$; A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional $-CH_2-$ may be substituted with $-O-$, optional $-CH=$ may be substituted with $-N=$, and optional hydrogen may be substituted with halogen, alkyl having a carbon number of approximately 1 to approximately 5 or halogenated alkyl having a carbon number of approximately 1 to approximately 5; Z is independently a single bond or alkylene having a carbon number of approximately 1 to approximately 20; in the alkylene, optional $-CH_2-$ may be substituted with $-O-$, $-CO-$, $-COO-$, $-OCO-$, $-CH=CH-$, $-CF=CF-$ or $-C\equiv C-$, and optional hydrogen may be substituted with halogen; Y is a single bond or alkylene having a carbon number of approximately 1 to approximately 20; in the alkylene, optional $-CH_2-$ may be substituted with $-O-$, $-CO-$, $-COO-$, $-OCO-$ or $-CH=CH-$, and optional hydrogen may be substituted with halogen; and m and n each are an integer of approximately 0 to approximately 5.

DETAILED DESCRIPTION OF THE INVENTION

Reference will now be made in detail to the preferred embodiments of the invention. This invention may, however, be embodied in many different forms and should not be construed as limited to the embodiments set forth herein. In addition and as will be appreciated by one of skill in the art, the invention may be embodied as a method, system or process.

The embodiments of the invention are described in the following items. The preferred examples of an end group, a ring and a bonding group in the compound (1) shall be described below as well.

[1] A compound represented by Formula (1):

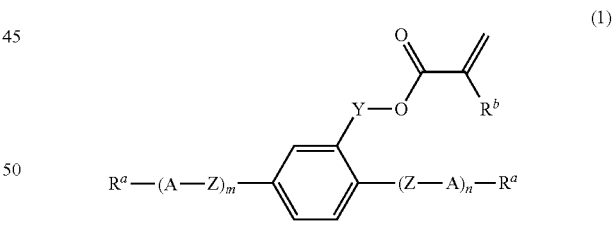

In Formula (1), $R^a$ is independently hydrogen, halogen, cyano, $-CF_3$, $-CF_2H$, $-CFH_2$, $-OCF_3$, $-OCF_2H$, $-N=C=O$, $-N=C=S$ or alkyl having a carbon number of approximately 1 to approximately 20; in the alkyl, optional $-CH_2-$ may be substituted with $-O-$, $-S-$, $-SO_2-$, $-CO-$, $-COO-$, $-OCO-$, $-CH=CH-$, $-CF=CF-$ or $-C\equiv C-$, and optional hydrogen may be substituted with halogen; $R^b$ is fluorine or $-CF_3$; A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional $-CH_2-$ may be substituted with $-O-$, optional $-CH=$ may be substituted with $-N=$, and optional hydrogen may be substituted with halogen, alkyl having a carbon number of approximately 1 to approximately 5 or halogenated alkyl having a carbon number of approximately 1 to approximately 5; Z is independently a single bond or alkylene having a carbon number of approximately 1 to approximately 20; in the alkylene, optional —$CH_2$— may be substituted with —S—, —CO—, —COO—, —OCO—, —CH=CH—, —CF=CF— or —C≡C—, and optional hydrogen may be substituted with halogen; Y is a single bond or alkylene having a carbon number of approximately 1 to approximately 20; in the alkylene, optional —$CH_2$— may be substituted with —O—, —CO—, —COO—, —OCO— or —CH=CH—, and optional hydrogen may be substituted with halogen; and m and n each are an integer of approximately 0 to approximately 5.

Preferred $R^a$ are hydrogen, chlorine, fluorine, cyano, —N=C=O, —N=C=S, alkyl, alkoxy, alkoxyalkyl, alkoxyalkoxy, alkylthio, alkylthioalkoxy, alkenyl, alkenyloxy, alkenyloxyalkyl, alkoxyalkenyl, alkynyl and alkynyloxy. In the above groups, groups in which at least one hydrogen is substituted with halogen are preferred as well. Preferred halogen are fluorine and chlorine, and further preferred halogen is fluorine. The specific examples thereof are monofluoroalkyl, polyfluoroalkyl, perfluoroalkyl, monofluoroalkoxy, polyfluoroalkoxy and perfluoroalkoxy. In the above groups, the linear groups are preferred to the branched group. Branched $R^a$ is preferred for obtaining an optically active compound.

Further preferred $R^a$ are hydrogen, fluorine, chlorine, cyano, —$CF_3$, —$CF_2H$, —$CFH_2$, —$OCF_3$, —$OCF_2H$, alkyl having a carbon number of approximately 1 to approximately 10, alkoxy having a carbon number of approximately 1 to approximately 10 and alkoxyalkyl having a carbon number of approximately 2 to approximately 10. The alkyl, the alkoxy and the alkoxyalkyl include, for example, methyl, ethyl, propyl, butyl, pentyl, hexyl, heptyl, octyl, nonyl, decyl, methoxy, ethoxy, propyloxy, butyloxy, pentyloxy, hexyloxy, heptyloxy, octyloxy, nonyloxy, decyloxy, methoxymethyl and methoxyethyl. Particularly preferred $R^a$ are alkyl having a carbon number of approximately 1 to approximately 10 and alkoxy having a carbon number of approximately 1 to approximately 10.

Preferred A are 1,4-cyclohexylene, 1,4-cyclohexenylene, 2,2-difluoro-1,4-cyclohexylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 3-fluoropyridine-2,5-diyl, pyrimidine-2,5-diyl, pyridazine-3,6-diyl, naphthalene-2,6-diyl, tetrahydronaphthalene-2,6-diyl, fluorene-2,7-diyl, 9-methyl-fluorene-2,7-diyl, 9,9-dimethylfluorene-2,7-diyl, 9-ethylfluorene-2,7-diyl, 9-fluorofluorene-2,7-diyl and 9,9-difluorofluorene-2,7-diyl.

In the configuration of 1,4-cyclohexylene and 1,3-dioxane-2,5-diyl, trans is preferred to cis. 2-Fluoro-1,4-phenylene is structurally the same as 3-fluoro-1,4-phenylene, and therefore the latter is not given as the example. This rule shall be applied to the relation of 2,5-difluoro-1,4-phenylene to 3,6-difluoro-1,4-phenylene. When m is an integer of approximately 2 to approximately 10, two A's optionally selected may be the same or different.

Further preferred A are 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene and 2,6-difluoro-1,4-phenylene. Particularly preferred A are 1,4-cyclohexylene and 1,4-phenylene.

Preferred Z are a single bond, —$(CH_2)_2$—, —$(CF_2)_2$—, —$CH_2O$—, —$OCH_2$—, —$CF_2O$—, —$OCF_2$—, —COO—, —OCO—, —CH=CH—, —CF=CF—, —$(CH_2)_4$—, —$(CH_2)_3O$—, —$O(CH_2)_3$—, —$(CH_2)_2COO$—, —$OCO(CH_2)_2$—, —CH=CH—COO— and —OCO—CH=CH—.

Further preferred Z are a single bond, —$(CH_2)_2$—, —COO—, —OCO—, —$CH_2O$—, —$OCH_2$—, —$CF_2O$—, —$OCF_2$—, —CH=CH—, —$(CH_2)_2COO$—, —$OCO(CH_2)_2$—, —CH=CH—COO—, and —OCO—CH=CH—. Particularly preferred Z are a single bond, —COO—, —OCO—, —CH=CH—, —$(CH_2)_2COO$—, —$OCO(CH_2)_2$—, —CH=CH—COO— and —OCO—CH=CH—. When m is an integer of approximately 2 to approximately 10, two Z's optionally selected may be the same or different.

Preferred Y are a single bond and alkylene having a carbon number of approximately 1 to approximately 10, and in the alkylene, optional —$CH_2$— may be substituted with —O—, —COO— or —OCO—.

[2] The compound as described in item [1], wherein in Formula (1), m+n is an integer of approximately 1 to approximately 3.

[3] The compound as described in item [1], wherein in Formula (1), m+n is 2.

[4] The compound as described in any of the items [1] to [3], wherein in Formula (1), $R^a$ is independently alkyl having a carbon number of approximately 1 to approximately 10, alkoxy having a carbon number of approximately 1 to approximately 10 or alkenyl having a carbon number of approximately 2 to approximately 10, and optional hydrogens thereof may be substituted with fluorine; A is independently 1,4-cyclohexylene, 1,4-phenylene, pyridine-2,5-diyl, pyridazine-3,6-diyl or pyrimidine-2,5-diyl, and optional hydrogens thereof may be substituted with chlorine, fluorine, alkyl having a carbon number of approximately 1 to approximately 3 or fluoroalkyl having a carbon number of approximately 1 to 3 approximately; Z is independently a single bond, —$CH_2O$—, —$OCH_2$—, —COO—, —OCO—, —CH=CH—, —$(CH_2)_2COO$—, —$OCO(CH_2)_2$—, —CH=CH—COO—, —OCO—CH=CH— or —C≡C—; Y is a single bond or alkylene having a carbon number of 1 to 10; in the alkylene, optional —$CH_2$— may be substituted with —O—, —COO— or —OCO—.

[5] A compound represented by any of Formulas (I), (II) and (III):

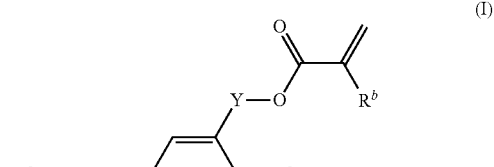

(I)

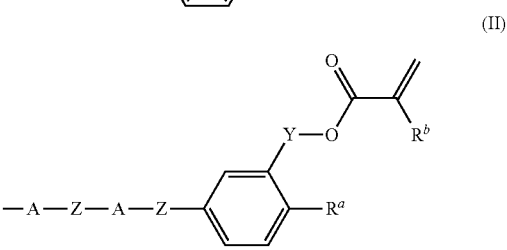

(II)

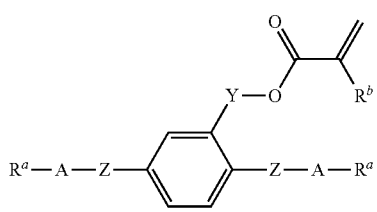

(III)

In Formulas (I), (II) and (III), $R^a$ is independently hydrogen, halogen, cyano, —CF$_3$, —CF$_2$H, —CFH$_2$, —OCF$_3$, —OCF$_2$H, —N=C=O, —N=C=S or alkyl having a carbon number of 1 to 20; in the alkyl, optional —CH$_2$— may be substituted with —O—, —S—, —SO$_2$—, —CO—, —COO—, —OCO—, —CH=CH—, —CF=CF— or —C≡C—, and optional hydrogen may be substituted with halogen; $R^b$ is fluorine or —CF$_3$; A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —CH$_2$— may be substituted with —O—, optional —CH= may be substituted with —N=, and optional hydrogen may be substituted with halogen, alkyl having a carbon number of approximately 1 to approximately 5 or halogenated alkyl having a carbon number of approximately 1 to approximately 5; Z is independently a single bond or alkylene having a carbon number of approximately 1 to approximately 20; in the above alkylene, optional —CH$_2$— may be substituted with —O—, —CO—, —COO—, —OCO—, —CH=CH—, —CF=CF— or —C≡C—, and optional hydrogen may be substituted with halogen; Y is a single bond or alkylene having a carbon number of approximately 1 to approximately 20; in the alkylene, optional —CH$_2$— may be substituted with —O—, —CO—, —COO—, —OCO— or —CH=CH—, and optional hydrogen may be substituted with halogen.

[6] The compound as described in item [5], wherein in Formulas (I), (II) and (III), $R^a$ is independently alkyl having a carbon number of approximately 1 to approximately 10, alkoxy having a carbon number of approximately 1 to approximately 10 or alkenyl having a carbon number of approximately 2 to approximately 10, and optional hydrogens thereof may be substituted with fluorine; A is independently 1,4-cyclohexylene, 1,4-phenylene, pyridine-2,5-diyl, pyridazine-3,6-diyl or pyrimidine-2,5-diyl, and optional hydrogens thereof may be substituted with chlorine, fluorine, alkyl having a carbon number of approximately 1 to approximately 3 or fluoroalkyl having a carbon number of approximately 1 to approximately 3; Z is independently a single bond, —CH$_2$O—, —OCH$_2$—, —COO—, —OCO—, —CH=CH—, —(CH$_2$)$_2$COO—, —OCO(CH$_2$)$_2$—, —CH=CH—COO—, —OCO—CH=CH— or —C≡C—; Y is a single bond or alkylene having a carbon number of approximately 1 to approximately 10; in the alkylene, optional —CH$_2$— may be substituted with —O—, —COO— or —OCO—.

[7] The compound as described in item [5], wherein in Formulas (I), (II) and (III), $R^a$ is independently alkyl having a carbon number of approximately 1 to approximately 10 or alkoxy having a carbon number of approximately 1 to approximately 10; A is independently 1,4-cyclohexylene or 1,4-phenylene; Z is independently a single bond, —COO—, —OCO—, —CH=CH—, —(CH$_2$)$_2$COO—, —OCO (CH$_2$)$_2$—, —CH=CH—COO—, —OCO—CH=CH— or —C≡C—; Y is a single bond or alkylene having a carbon number of approximately 1 to approximately 10; in the alkylene, —CH$_2$— adjacent to the ring may be substituted with —O—, —COO— or —OCO—.

[8] A composition that includes at least one compound as described in any of items [1] to [7].

[9] The composition as described in item [8], further including a polymerizable compound which is different from the compound as described in any of items [1] to [7].

[10] The composition as described in item [8] or [9], further including a polymerizable optically active compound which is different from the compound as described in any of items [1] to [7].

[11] The composition as described in any of items [8] to [10], further including a non-polymerizable liquid crystalline compound.

[12] The composition as described in any of items [8] to [11], further including a non-polymerizable optically active compound.

[13] The composition as described in any of items [8] to [12], further including a polymerization initiator.

[14] The composition as described in any of items [8] to [13], further including a solvent.

[15] A polymer obtained by polymerizing the composition as described in any of items [8] to [14].

[16] The polymer as described in item [15], wherein the weight average molecular weight is approximately 500 to approximately 1,000,000.

[17] The polymer as described in item [15], wherein the weight average molecular weight is approximately 1,000 to approximately 500,000.

[18] The polymer as described in any of items [15] to [17], wherein it is an optically active compound.

[19] A film that includes the polymer as described in any of items [15] to [18].

[20] A molded article having an optical anisotropy which includes the polymer as described in any of items [15] to [18].

[21] A liquid crystal display element that includes the composition as described in any of items [8] to [14], the polymer as described in any of items [15] to [18], the film as described in item [19] or the molded article having an optical anisotropy as described in item [20].

The compound of the invention has properties such as a high polymerization reactivity, a broad temperature range in a liquid crystal phase and a good miscibility, and the composition that includes the compound of the invention has a good coating property and the like. The polymer obtained by polymerizing the composition of the invention is excellent in characteristics such as an optical anisotropy, a transparency, a chemical stability, a heat resistance, a hardness, an adhesiveness, a firm adhesion and a mechanical strength, and it has the characteristic that a water permeating property, a water absorbing property and a gas permeating property are low. Accordingly, the polymer of the invention is suited for use as a retardation film, a polarizing element, a circularly polarized light element, an elliptically polarized light element, an antireflection film, a selective reflection film, a color compensator, a viewing angle compensator and a liquid crystal alignment film. The mechanical strength described above includes a Young's modulus, a tensile strength, a tearing strength, a flexural strength, a flexural elastic modulus and an impact strength.

The lateral α-substituted acrylate compound according to the invention, the composition that includes the compound, the polymer obtained from the composition and applications thereof shall be explained in details.

Terms in the present specification shall be used in the following manner:

The term "liquid crystalline compound" is a general term for compounds having a liquid crystal phase such as a nematic phase, a smectic phase and the like and compounds which do not have a liquid crystal phase but are useful as components for liquid crystal compositions. The term "compound (1)" means the compound represented by Formula (1). Further, it means at least one of the compounds represented by Formula (1) in a certain case. The term "composition (1)" means a composition that includes at least one compound selected from the compounds (1). The term "polymer (1)" means a polymer obtained by polymerizing the composition (1). The term "(meth)acryloyloxy" means acryloyloxy or methacryloyloxy, the term "(meth)acrylate" means acrylate or methacrylate, and the term "(meth)acrylic acid" means acrylic acid or methacrylic acid.

In the chemical formulas, when one compound has plural A's, optional two A's may be the same or different. This rule shall be applied to the codes of Y, Z and the like. The meaning of a phrase "in the alkyl, optional —$CH_2$— may be substituted with —O—, —CH=CH— and the like" shall be shown below by one example. A group in which optional —$CH_2$— in $C_4H_9$— is substituted with —O— or —CH=CH— includes, for example, $C_3H_7O$—, $CH_3$—O—$(CH_2)_2$—, $CH_3$—O—$CH_2$—O—, $H_2C$=CH—$(CH_2)_3$—, $CH_3$—CH=CH—$(CH_2)_2$— and $CH_3$—CH=CH—$CH_2$—O—. As described above, the term "optional" means "at least one selected without distinction." Considering the stability of the compound, $CH_3$—O—$CH_2$—O— in which oxygen is not adjacent to oxygen is preferred to $CH_3$—O—O—$CH_2$— in which oxygen is adjacent to oxygen.

Compound

The compound (1) of the invention has, as shown in Formula (1) described above, α-substituted acryloyloxy which is a polymerizable group and therefore shows characteristics such as a high polymerization reactivity, a broad temperature range in a liquid crystal phase, a suitable optical anisotropy and a good miscibility. As shown in Formula (1) described above, $R^b$ in α-substituted acryloyloxy which is a polymerizable group is fluorine or —$CF_3$, whereby the advantages that the compound (1) has a good orientation and a good heat resistance and that a temperature range of a liquid crystal phase is broadened are obtained in a certain case as compared with a case where $R^b$ is hydrogen or methyl.

When the compound (1) is mixed with other liquid crystalline compounds and polymerizable compounds, it is readily compatible with them. The compound (1) is characterized by that a part thereof has a liquid crystallinity. Further, the compound (1) is characterized by that it has an optical activity when it has asymmetric carbon.

Suitable selection of the end groups, the rings and the bonding groups of the compound (1) make it possible to optionally control the physical properties such as the optical anisotropy. The effects given to the properties of the compound (1) by the kinds of end group $R^a$, the ring A and the bonding group Z shall be explained below.

When $R^a$ is linear alkyl, the temperature range of the liquid crystal phase is broad, and the viscosity thereof is low. When $R^a$ is branched alkyl, the compatibility with other liquid crystalline compounds is good. Also when $R^a$ is cyano, halogen, —$CF_3$ or —$OCF_3$, a good temperature range of the liquid crystal phase is shown, and suitable compatibility is provided. Particularly when $R^a$ is cyano, the large optical anisotropy value is provided, and when it is —F, —$CF_3$ or —$OCF_3$, the small optical anisotropy value is provided.

When the ring A is 1,4-phenylene, 1,4-phenylene in which optional hydrogen is substituted with fluorine, pyridine-2,5-diyl, pyrimidine-2,5-diyl or pyridazine-3,6-diyl, the optical anisotropy is large. When the ring A is 1,4-cyclohexylene, 1,4-cyclohexenylene or 1,3-dioxane-2,5-diyl, the optical anisotropy is small. When at least two rings of the plural rings A are 1,4-cyclohexylene, the compound has a high clearing point, a small optical anisotropy and a low viscosity. When at least one ring is 1,4-phenylene, the optical anisotropy is relatively large, and the orientational order parameter is large. When at least two rings are 1,4-phenylene, the compound has a large optical anisotropy, a broad temperature range in the liquid crystal phase and a high clearing point.

When the bonding group Z is a single bond, —$(CH_2)_2$—, —$CH_2O$—, —$OCH_2$—, —$CF_2O$—, —$OCF_2$—, —CH=CH—, —CF=CF— or —$(CH_2)_4$—, the viscosity is low. When the bonding group Z is a single bond, —$(CH_2)_2$—, —$OCF_2$—, —$CF_2O$—, —CH=CH— or —$(CH_2)_4$—, the viscosity is lower. When the bonding group Z is —CH=CH— or —CF=CF—, the temperature range in the liquid crystal phase is broad, and the elastic constant ratio is large. When the bonding group Z is —C≡C—, the optical anisotropy is large.

When the compound (1) has three or less rings, the viscosity is low, and when it has three or more rings, the clearing point is high. In this specification, a six-membered ring and the like are regarded as a ring, and a three-membered ring is not regarded as a ring.

The compound (1) may be either optically active or optically inactive. When it is optically active, the compound (1) has asymmetric carbon. A configuration of asymmetric carbon may be either R or S. When it has asymmetric carbon, it has a good compatibility.

As described above, the compound having intended physical properties can be obtained by suitably selecting the kinds of the end groups, the rings and the bonding groups and the number of the rings.

When the compound (1) has two or less rings and when $R^a$ is —Cl, —Br, —I, —COOH, —COCl, —COBr, —CHO, —OH, —$OSO_2CH_3$ or —$OSO_2C_6H_4CH_3$-p, it is particularly useful as a synthetic intermediate. For example, when $R^a$ is —COOH, —COCl or —COBr, the compound can be derived into an ester compound by using a corresponding alcohol or phenol derivative. Similarly, when $R^a$ is —Cl, —Br, —I, —OH, —$OSO_2CH_3$ or —$OSO_2C_6H_4CH_3$-p, the compound can be derived into an ether compound. Also, when $R^a$ is —CHO, it can be derived into —CH=CH— by a Wittig reagent. The above compounds can be further derived as well into another synthetic intermediates in a range in which the α-substituted acryloyloxy group described above is allowed to be stably present by combining organic synthetic chemical methods.

The compound (1) can be synthesized by combining organic synthetic chemical methods. Methods in which the intended end groups, rings and boding groups are introduced into a starting material are described in documents such as Houben-Wyle, METHODS OF ORGANIC CHEMISTRY, George Thieme Verlag, Stuttgart; ORGANIC SYNTHESES, John Wily & Sons, Inc.; Organic Reactions, John Wily & Sons, Inc.; COMPREHENSIVE ORGANIC SYNTHESIS, Pergamon Press; and NEW EXPERIMENTAL CHEMICAL COURSE, Maruzen.

α-Substituted acrylic acid and α-substituted acrylic halide can be used for introducing the α-substituted acryloyloxy group described above. Synthetic methods for α-fluoroacrylic fluoride are described in *J. Org. Chem.*, 54, 5640 (1989); Japanese Patent Application Laid-Open No. 158137/

1985; and Japanese Patent Application Laid-Open No. 85345/1986. Synthetic methods for α-chloroacrylic chloride are described in DE2357816, DE2350119 and DE2357677. Synthetic methods for α-trifluoromethylacrylic chloride are described in *Org. Lett.*, 3, 2915 (2001) and the like. The compound (1) can be synthesized by making use of the above compounds as the starting materials.

The synthesis of the bonding group Z shall be explained in schemes 1 to 12. In these schemes, $MSG^1$ and $MSG^2$ are monovalent organic groups having at least one ring. Plural $MSG^1$ (or $MSG^2$) may be the same or different. Compounds (1A) to (1M) correspond to the compound (1) of the invention. These methods can be applied to the optically active compound (1) and the optically inactive compound (1).

Scheme 1: Compound in which Z is a Single Bond

As shown below, arylboric acid (S1) is reacted with a compound (S2) synthesized by a publicly known method in a carbonate aqueous solution under the presence of a catalyst such as tetrakis(triphenylphosphine)palladium, whereby a compound (1A) can be synthesized. This compound (1A) can be synthesized as well by reacting a compound (S3) synthesized by a publicly known method with n-butyllithium and subsequently with zinc chloride and then further reacting with the compound (S2) under the presence of a catalyst such as dichlorobis-(triphenylphosphine)palladium.

Scheme 2: Compound in which Z is —CH=CH—

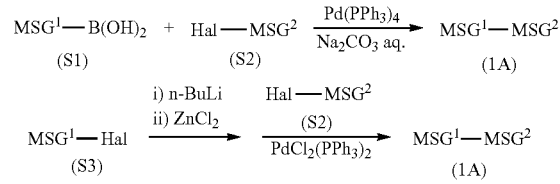

As shown below, a base such as potassium t-butoxide is added to a phosphonium salt (S5) synthesized by a publicly known method to produce phosphorus ylide, and it is reacted with aldehyde (S4), whereby a compound (1B) can be synthesized. The cis body is produced depending on the reaction conditions and the base material, and therefore the cis body is isomerized, if necessary, to the trans body by a publicly known method.

Scheme 3: Compound in which Z is —(CH$_2$)$_2$—

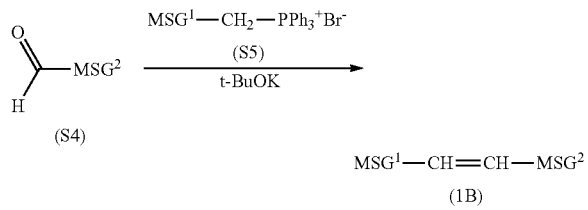

As shown below, the compound (1B) is hydrogenated in the presence of a catalyst such as palladium carbon, whereby a compound (1C) can be synthesized.

Scheme 4: Compound in which Z is —(CF$_2$)$_2$—

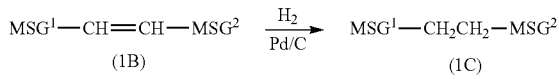

As shown below, diketone (S6) is fluorinated by sulfur tetrafluoride in the presence of a hydrogen fluoride catalyst according to a method described in *J. Am. Chem. Soc.*, 123, 5414 (2001), whereby a compound (1D) having —(CF$_2$)$_2$— can be synthesized.

Scheme 5: Compound in which Z is —(CH$_2$)$_4$—

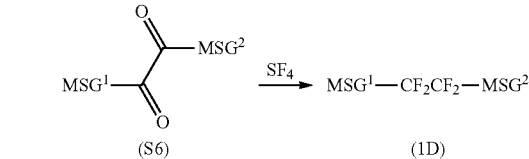

As shown below, in the method shown in the Scheme 2, a phosphonium salt (S7) is used in place of the phosphonium salt (S5) to synthesize a compound having —(CH$_2$)$_2$—CH=CH—, and this is catalytically hydrogenated, whereby a compound (1E) can be synthesized.

Scheme 6: Compound in which Z is —CH$_2$O— or —OCH$_2$—

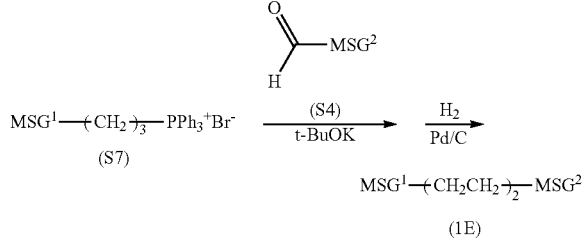

As shown below, the compound (S4) is first reduced by a reducing agent such as sodium boron hydride to obtain a compound (S8). This compound is halogenated by hydrobromic acid or the like to obtain a compound (S9). Then, the compound (S9) is reacted with a compound (S10) in the presence of potassium carbonate or the like, whereby a compound (1F) can be synthesized. A compound having —CH$_2$O— can be synthesized as well by the above method.

Scheme 7: Compound in which Z is —COO— or —OCO—

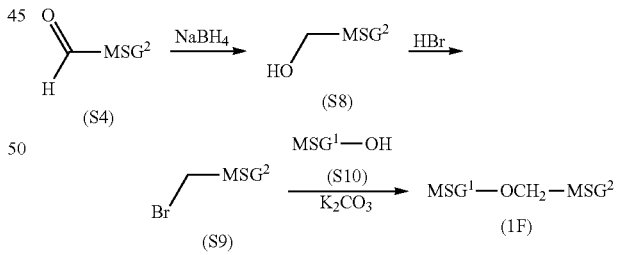

As shown below, the compound (S3) is reacted with n-butyllithium and then with carbon dioxide to obtain carboxylic acid (11). The compound (S11) is dehydrated with phenol (S10) in the presence of DCC (1,3-dicyclohexylcarbodiimide) and DMAP (4-dimethylaminopyridine), whereby a compound (1G) having —COO— can be synthesized. A compound having —OCO— can be synthesized as well by the above method. Also, (S11) is reacted with thionyl chloride or oxalyl chloride and derived into an acid chloride compound, and it is reacted with (S10) in the presence of a base such as pyridine or triethylamine, whereby the compound (1G) can be synthesized as well.

Scheme 8: Compound in which Z is —CF=CF—

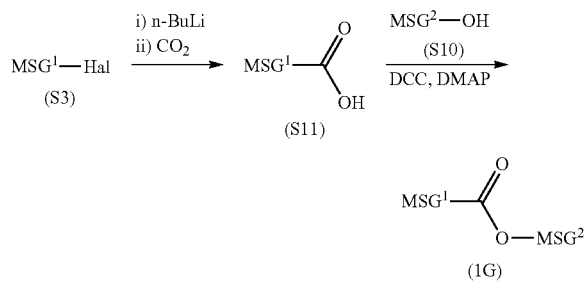

As shown below, the compound (S3) is first treated with n-butyllithium, and then it is reacted with tetrafluoroethylene to obtain a compound (S12). Subsequently, the compound (S2) is treated with n-butyllithium and then reacted with the compound (S12), whereby a compound (1H) can be synthesized. The compound (1H) of a cis body can be produced as well by selecting the synthetic conditions.

Scheme 9: Compound in which Z is —C≡C—

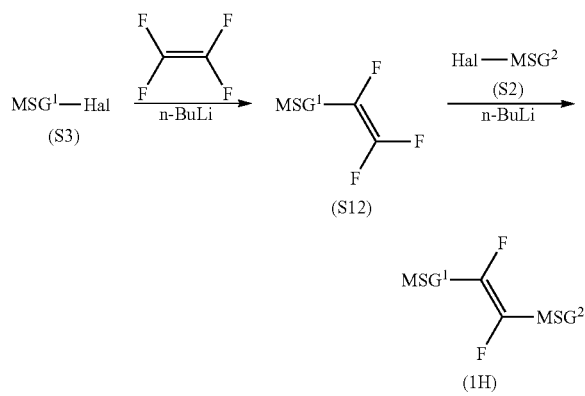

As shown below, a compound (S13) is reacted with the compound (S2) in the presence of a catalyst of dichloropalladium and copper halide, whereby a compound (1J) can be synthesized.

Scheme 10: Compound in which Z is —C≡C—COO—

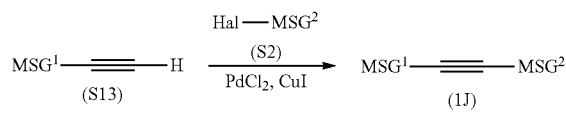

As shown below, the compound (S13) is first subjected to lithiation with n-butyllithium and then reacted with carbon dioxide to obtain carboxylic acid (S14). Then, the carboxylic acid (S14) is dehydrated with phenol (S10) in the presence of DCC and DMAP, whereby a compound (1K) having —C≡C—COO— can be synthesized. A compound having —OCO—C≡C— can be synthesized as well by the above method. Also, as (S11) has been derived into (1G) in the scheme 7, the compound (1K) can be synthesized as well through an acid chloride compound.

Scheme 11: Compound in which Z is —C≡C—CH=CH— or —CH=CH—C≡C—

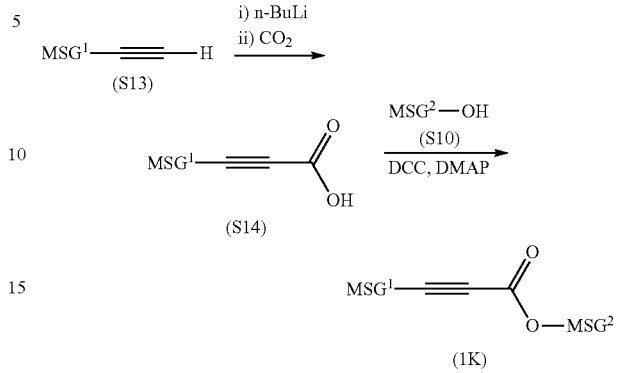

As shown below, the compound (S13) is subjected to cross coupling reaction with vinyl bromide (S15), whereby a compound (1L) having —C≡C—CH=CH— can be synthesized. Use of the compound (S15) of a cis body makes it possible to produce (1L) of a cis body.

Scheme 12: Compound in which Z is —CF$_2$O— or —OCF$_2$—

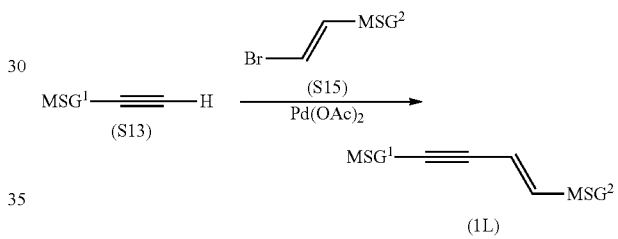

As shown below, the compound (1G) is first treated with a sulfurizing agent such as a Lawson's reagent to obtain a compound (S16). Then, a hydrogen fluoride pyridine complex and NBS (N-bromosuccinimide) are used to fluorinate the compound (S16), whereby a compound (1M) having —CF$_2$O— can be synthesized. The compound (1M) can be synthesized as well by fluorinating the compound (S16) by (diethylamino)sulfur trifluoride (DAST). The compound having —OCF$_2$— can be synthesized as well by the above method. It is possible as well to produce the bonding groups thereof by a method described by P. Kirsch et al., *Angew. Chem. Int. Ed.*, 40, 1480 (2001).

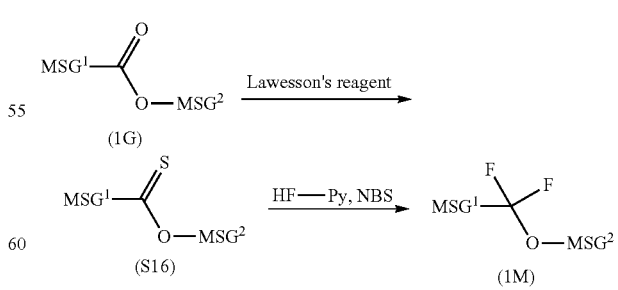

The examples (Compounds (a-1) to (d-8)) of the compounds synthesized by the methods described above shall be shown below. The structures of the compounds synthesized in the manners described above can be confirmed by, for example, $^1$H-NMR spectrum.

13                                14
a-1
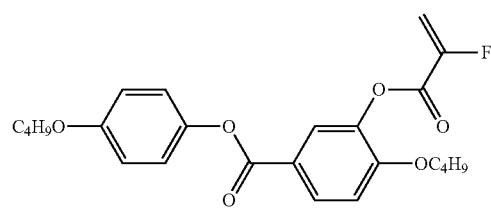
a-2
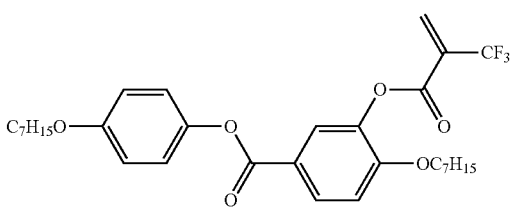
a-3
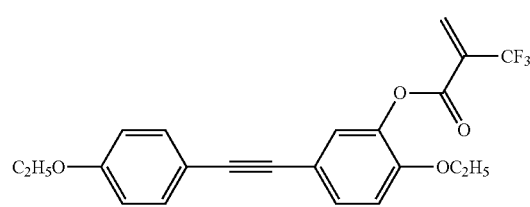
a-4
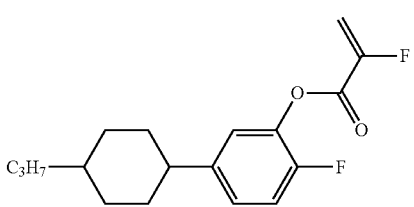
a-5
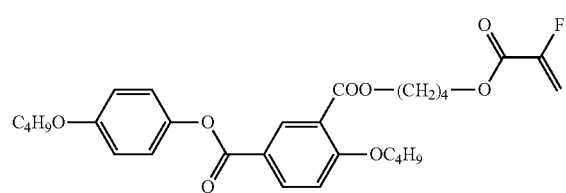
a-6
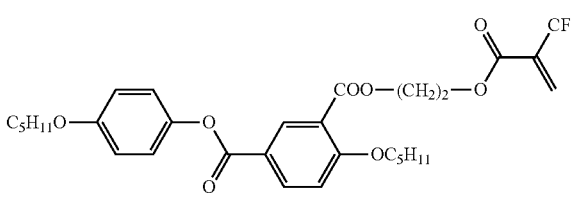
a-7
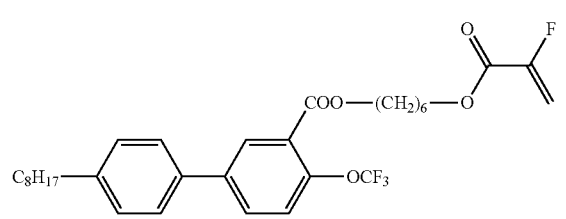
a-8
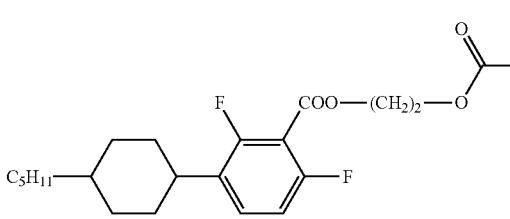
b-1
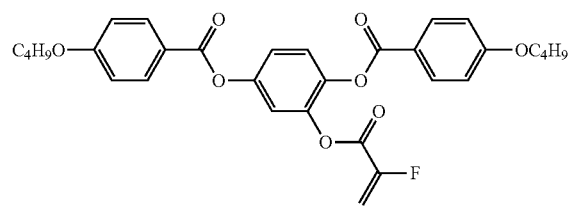
b-2
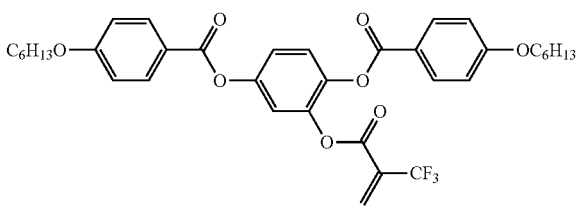
b-3
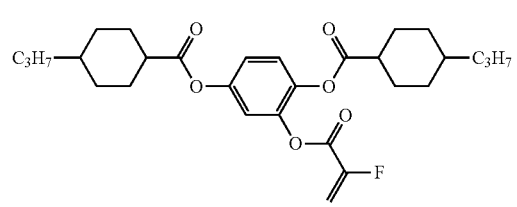
b-4
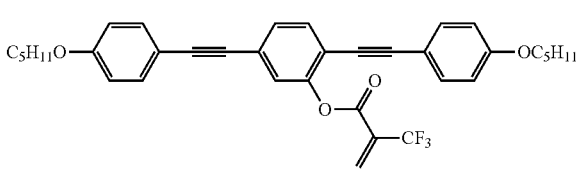
b-5
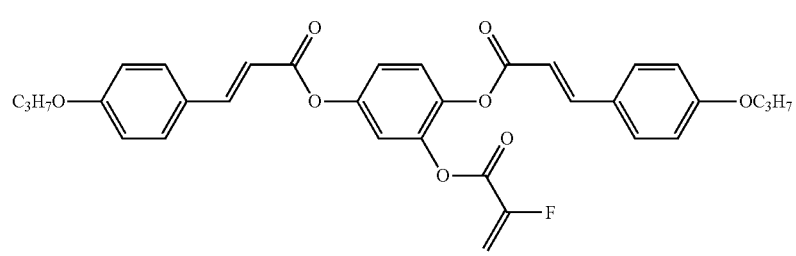

-continued
b-6
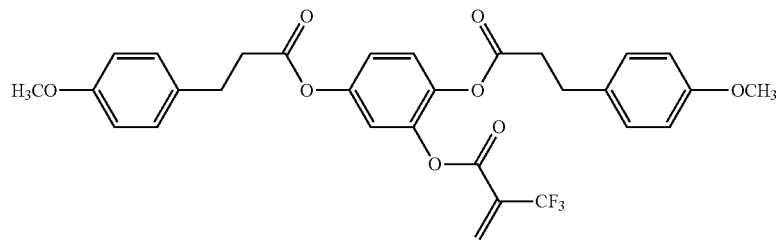
b-7
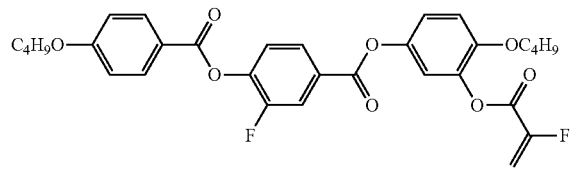
b-8
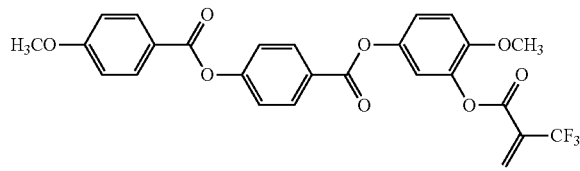
b-9
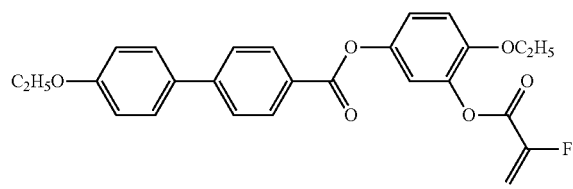
b-10
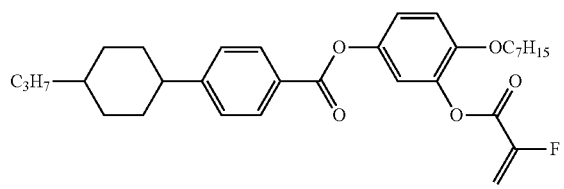
c-1
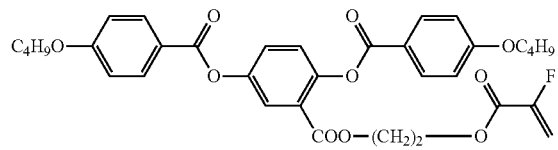
c-2
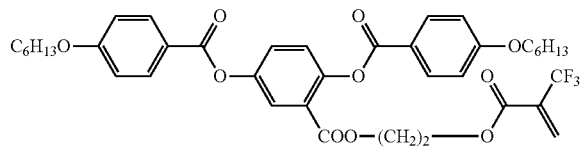
c-3
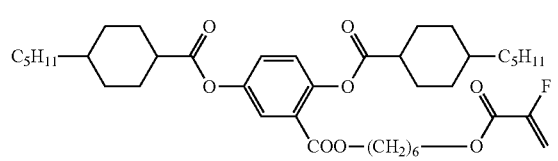
c-4
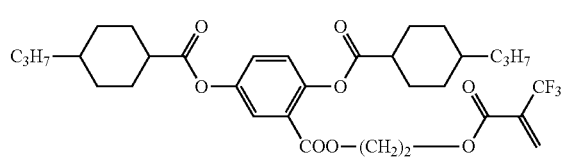
c-5
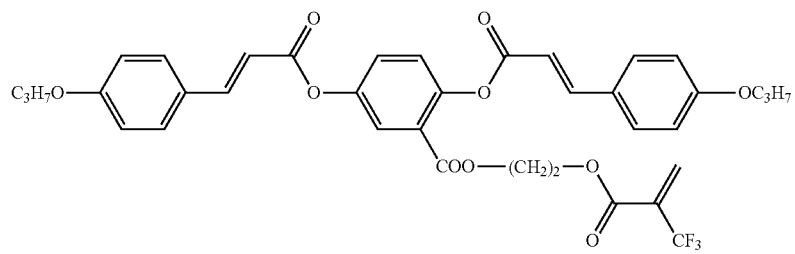
c-6
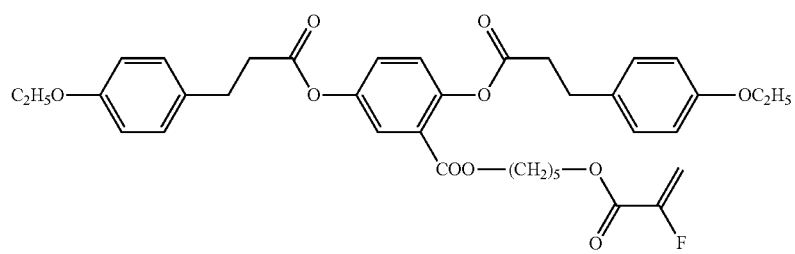

-continued
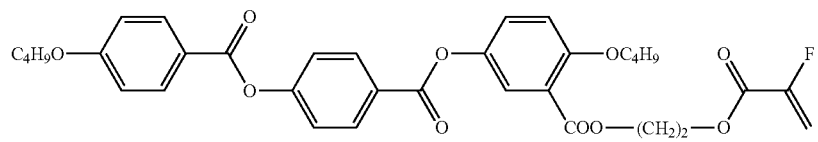
c-7
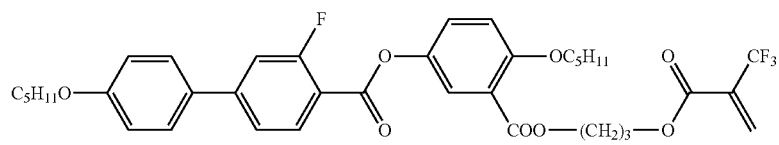
c-8
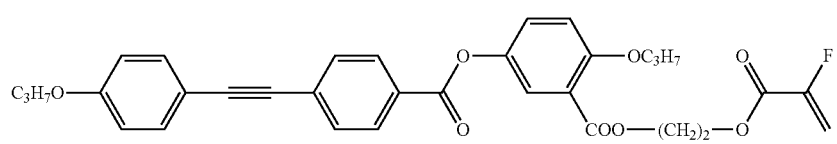
c-9
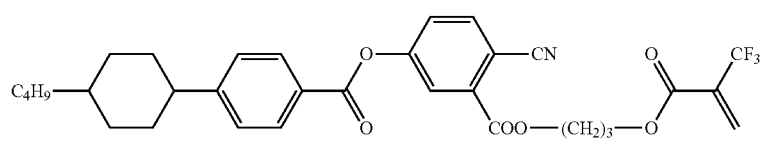
c-10
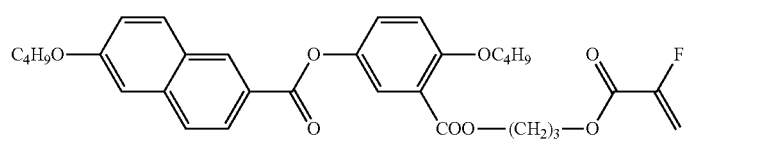
c-11
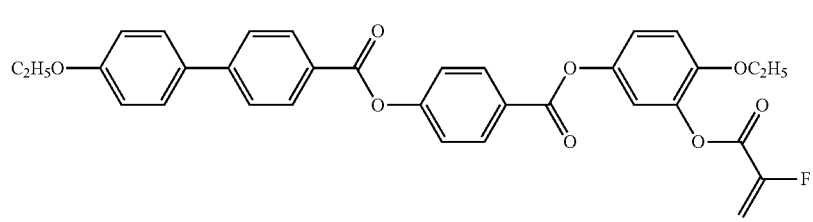
d-1
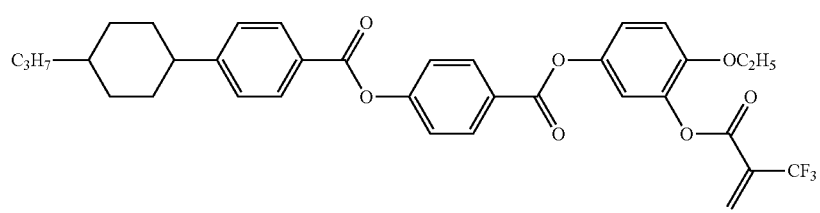
d-2
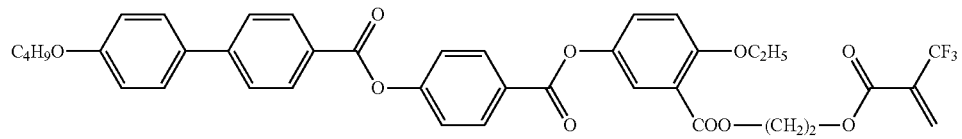
d-3
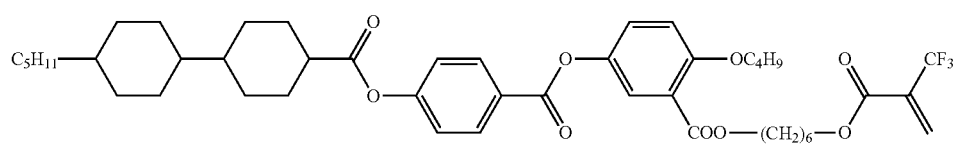
d-4

-continued

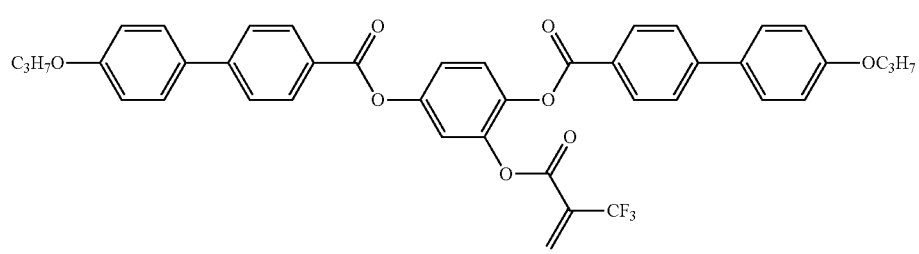

d-5

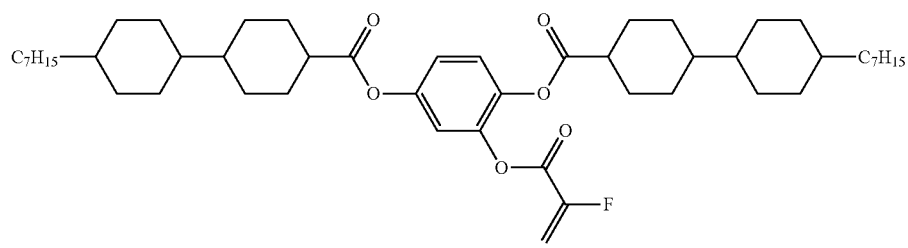

d-6

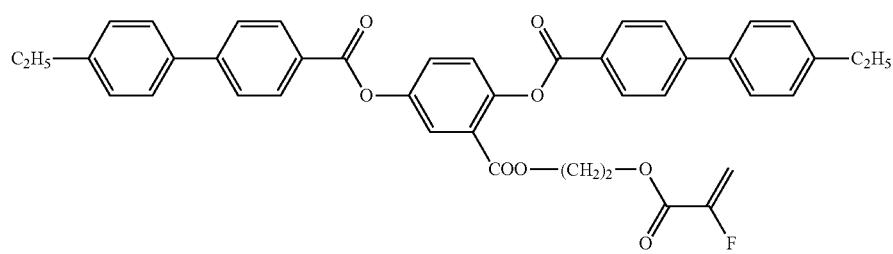

d-7

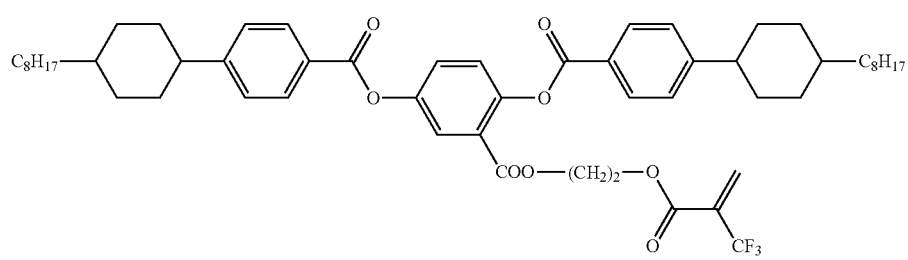

d-8

Composition

The composition (1) of the invention has characteristics such as having a good coating property and the like. The first embodiment in the composition (1) of the invention includes one compound (1). A homopolymer is obtained by polymerizing this composition. The second embodiment includes at least two compounds selected from the compounds (1). A copolymer is obtained by polymerizing this composition. These compositions may further incldue additives. The third embodiment includes at least one compound (1) and other polymerizable compounds. The other polymerizable compounds are compounds having a polymerizable group, but they are different from the compound (1). A copolymer is obtained as well by polymerizing this composition. The composition (1) of the invention may further include additives such as liquid crystalline compounds, optically active compounds, polymerization initiators, solvents, surfactants, antioxidants, UV absorbers and the like. These additives shall be explained in order of (1) the other polymerizable compounds, (2) the liquid crystalline compounds, (3) the optically active compounds, (4) the polymerization initiators, (5) the solvents, (6) the surfactants, (7) the antioxidants and (8) the UV absorbers.

1. Other Polymerizable Compounds

The composition (1) may include other polymerizable compounds. Compounds which do not reduce the coating film-producing property and the mechanical strength are preferred as the other polymerizable compounds. These compounds are classified into compounds having no liquid crystallinity and compounds having a liquid crystallinity.

The other polymerizable compounds having no liquid crystallinity include vinyl derivatives, styrene derivatives, (meth)acrylic acid derivatives, sorbic acid derivatives, fumaric acid derivatives and itaconic acid derivatives.

Preferred vinyl derivatives include, for example, vinyl chloride, vinyl fluoride, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methyl-butanoate, N-vinylacetamide, vinyl p-t-butylbenzoate, vinyl N,N-dimethylaminobenzoate, vinyl benzoate, ethyl vinyl ether, hydroxybutyl monovinyl ether, t-amyl vinyl ether, cyclohexanedimethanolmethyl vinyl ether, α,β-vinylnaphthalene, methyl vinyl ketone and isobutyl vinyl ketone.

Preferred styrene derivatives include, for example, styrene, o-chlorostyrene, m-chlorostyrene, p-chlorostyrene, o-chloromethylstyrene, m-chloromethylstyrene, p-chloromethylstyrene and α-methylstyrene.

Preferred (meth)acrylic acid derivatives include, for example, methyl(meth)acrylate, ethyl(meth)acrylate, butyl (meth)acrylate, 2-ethylhexyl(meth)acrylate, phenyl(meth)acrylate, 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylolpropane triacrylate, trimethylol EO-added triacrylate, pentaerythritol triacrylate, trisacryloyloxyethyl phosphate, bisphenol A EO-added diacrylate, bisphenol A glycidyl diacrylate (Biscoat 700® manufactured by Osaka Organic Chemical Co., Ltd.), polyethylene glycol diacrylate and dimethyl itaconate.

Preferred sorbic acid derivatives include, for example, sodium sorbate, potassium sorbate, lithium sorbate, 1-naphthylmethylammonium sorbate, benzylammonium sorbate, dodecylammonium sorbate, octadecylammonium sorbate, methyl sorbate, ethyl sorbate, propyl sorbate, isopropyl sorbate, butyl sorbate, t-butyl sorbate, hexyl sorbate, octyl sorbate, octadecyl sorbate, cyclopentyl sorbate, cyclohexyl sorbate, vinyl sorbate, allyl sorbate and propargyl sorbate.

Preferred fumaric acid derivatives include, for example, dimethyl fumarate, diethyl fumarate, diisopropyl fumarate, dibutyl fumarate, dicyclopentyl fumarate and dicyclohexyl fumarate.

Preferred itaconic acid derivatives include, for example, diethyl itaconate, dibutyl itaconate and diisopropyl itaconate.

In addition thereto, many polymerizable compounds such as butadiene, isoprene and maleimide can be used.

The other polymerizable compounds having a liquid crystallinity include liquid crystalline compounds which have an acryloyloxy group, a methacryloyloxy group, a fumaroyloxy group, a maleimidyl group, an oxirane ring or an oxetane ring as a functional group and which are not the compound (1). Such compounds can be used as well for controlling a liquid crystal phase temperature range of the composition (1). Among them, the liquid crystalline acrylic acid derivatives are preferred since they provide polymers which are transparent and have a large mechanical strength. In the compound excluding the liquid crystalline acrylic acid derivatives described above, time required for polymerization thereof is longer in a certain case than those of the acrylic acid derivatives. However, the above polymerizable compounds are useful in the points that side products are inhibited from being produced and that a mechanical strength and a heat stability of the polymers are enhanced.

In order to maintain the characteristics of the polymer of the invention and allow the characteristics of the copolymers described above to be notably revealed, structural units derived from compounds other than the compound (1) are desirably contained in a range of preferably from approximately 5 to approximately 95 mole %, and more preferably from approximately 60 to approximately 95 mole %. The structural unit having a liquid crystallinity and the structural unit having no liquid crystallinity can freely be changed in the range described above. The total amount thereof may advisably fall in the range described above or either of them may be contained.

The other polymerizable compounds having a liquid crystallinity described above include, for example, compounds represented by the following Formulas (BRM-1) to (BRM-16).

BRM-1
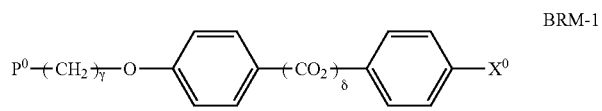

BRM-2
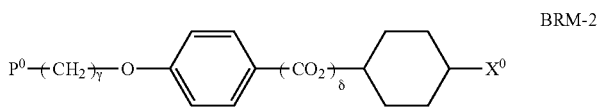

BRM-3
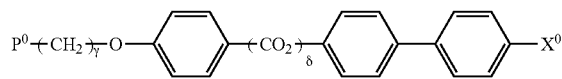

BRM-4
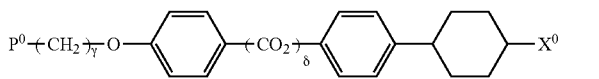

BRM-5

BRM-6
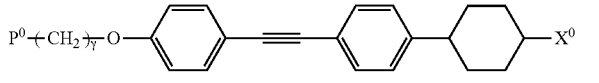

BRM-7
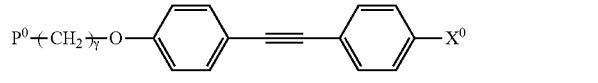

BRM-8

BRM-9

BRM-10

BRM-11
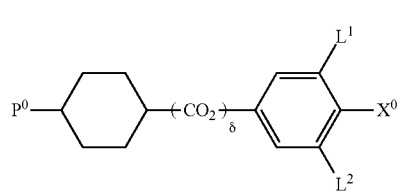

BRM-12
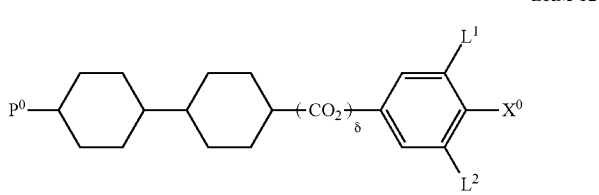

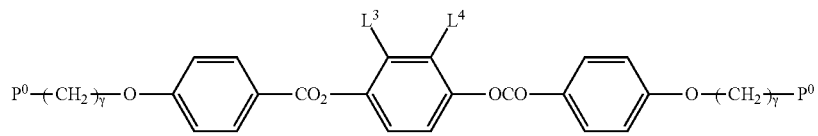
BRM-13

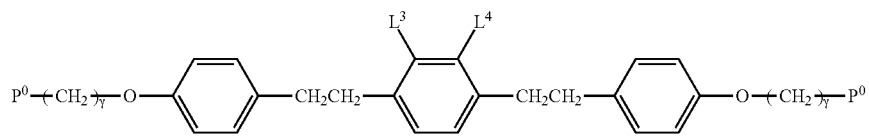
BRM-14

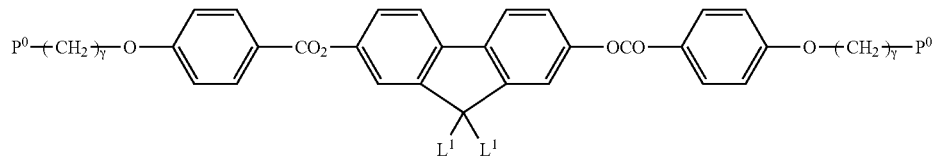
BRM-15

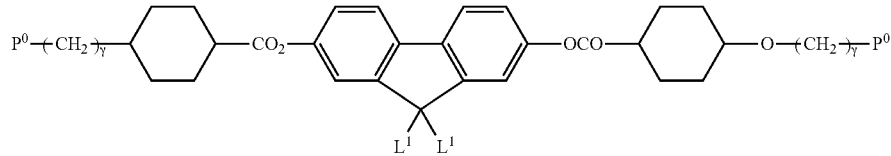
BRM-16

In Formulas (BRM-1) to (BRM-16) described above, $P^0$ represents a polymerizable group including an acryloyloxy group, a methacryloyloxy group, a fumaroyloxy group, a maleimidyl group, an oxirane ring or an oxetane ring; y represents approximately 0 to approximately 15; δ represents approximately 0 or approximately 1; $X^0$ represents alkyl or alkoxy having a carbon number of approximately 1 to approximately 15, halogen, halogenated alkyl or alkoxy having a carbon number of approximately 1 to approximately 3, cyano or —O (CH$_2$)γP$^0$; and $L^1$, $L^2$, $L^3$ and $L^4$ represent independently hydrogen, halogen, alkyl or alkoxy having a carbon number of approximately 1 to approximately 15 or halogenated alkyl or alkoxy having a carbon number of approximately 1 to approximately 3.

Among them, the particularly preferred other polymerizable compounds having a liquid crystallinity are shown as examples in the following Formulas (BRM-a-1) to (BRM-a-11) and (BRM-b-1) to (BRM-b-13). Any compounds can suitably be used as long as they are liquid crystalline compounds having the same physical properties, and therefore the above compounds shown as the examples shall not restrict the structure of the composition of the invention.

BRM-a-1
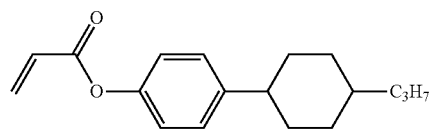

BRM-a-2
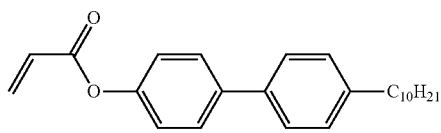

BRM-a-3
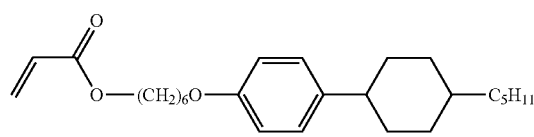

BRM-a-4

BRM-a-5
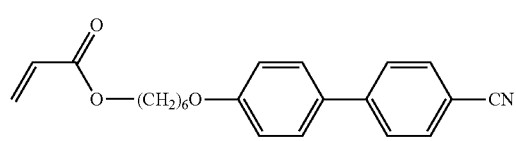

BRM-a-6

BRM-a-7
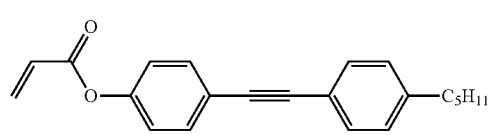

BRM-a-8
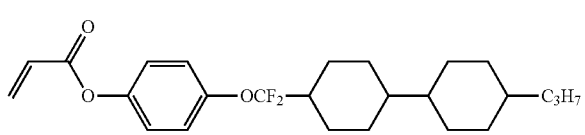

-continued
BRM-a-9
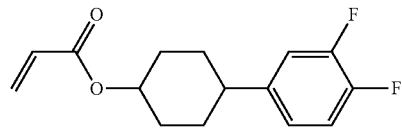
BRM-a-10
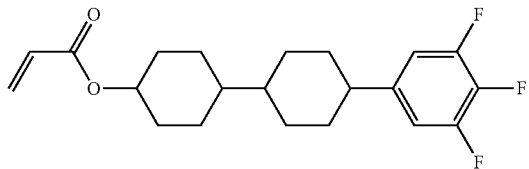
BRM-a-11
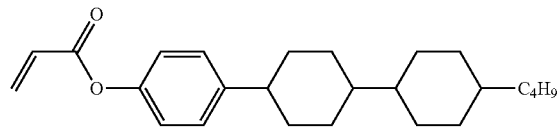
BRM-b-1
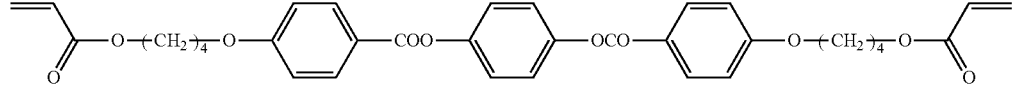
BRM-b-2
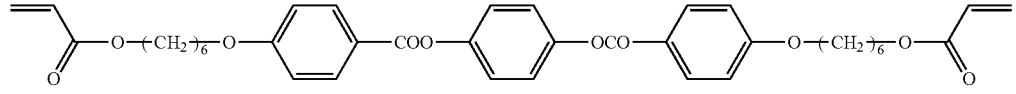
BRM-b-3
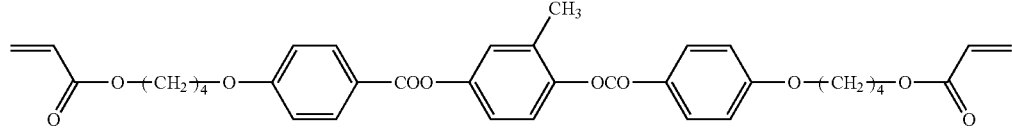
BRM-b-4
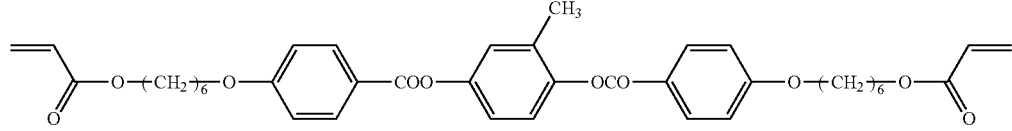
BRM-b-5
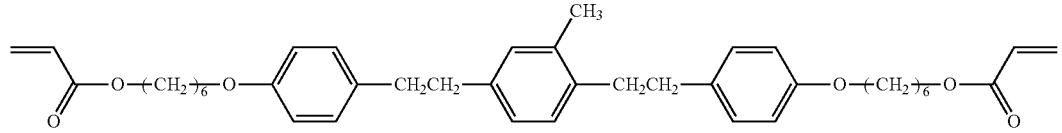
BRM-b-6
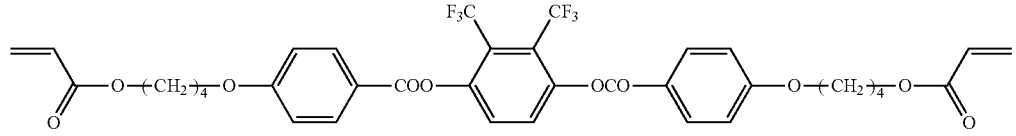
BRM-b-7
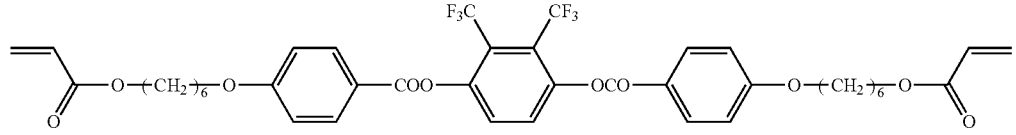
BRM-b-8
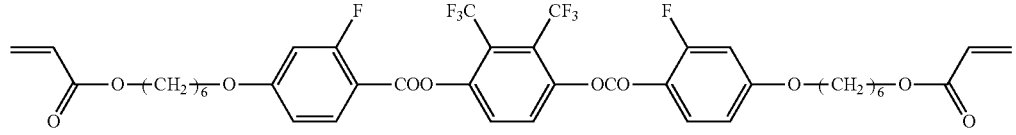
BRM-b-9
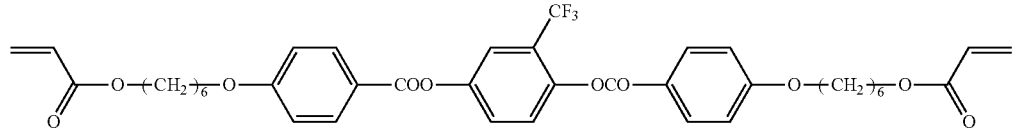

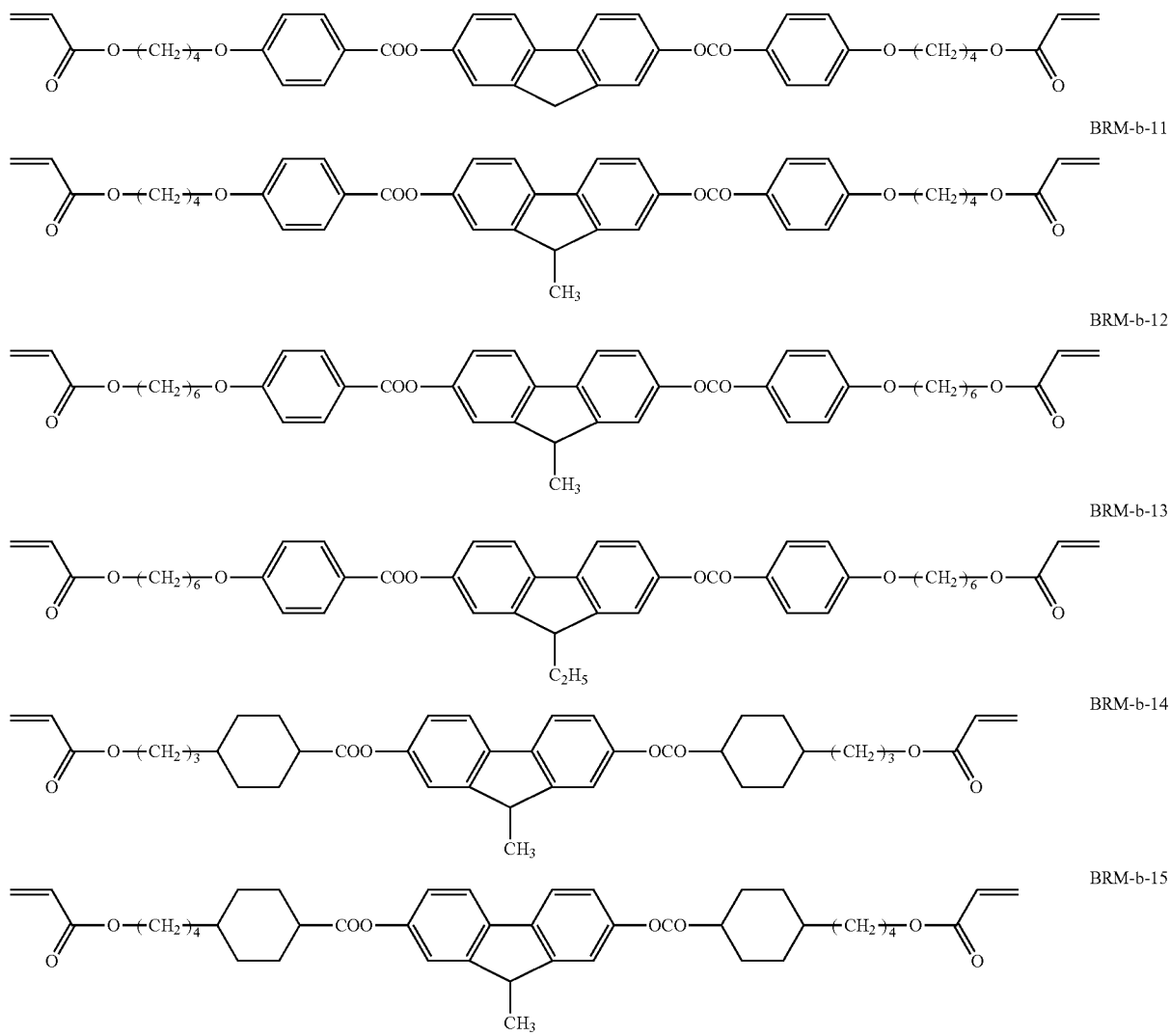

2. Liquid Crystalline Compound

The composition (1) may contain a liquid crystalline compound having no polymerizable group. The examples of such non-polymerizable liquid crystalline compound are described in LiqCryst, LC I Publisher GmbH, Hamburg, Germany, which is a data base for liquid crystalline compounds. The compound (1) has characteristics such as a broad temperature range of a liquid crystal phase and a good compatibility with other liquid crystalline compounds. Accordingly, the composition (1) containing the liquid crystalline compound can be used as a liquid crystal composition filled into a liquid crystal display element. Such composition (1) may further contain additives such as a dichroic pigment and the like. A composite material of the polymer of the compound (1) and the liquid crystalline compound can be obtained by polymerizing the composition (1) containing the liquid crystalline compound.

3. Optically Active Compound

The composition (1) may contain an optically active compound. A retardation film showing a helical structure (twist structure) is obtained by coating a composition containing a suited amount of the compound (1) having an optical activity or a composition obtained by adding a suited amount of an optically active compound to the compound (1) which is not optically active on a substrate subjected to aligning treatment and polymerizing it. This helical structure is fixed by polymerizing the compound (1). The characteristics of the optical isomer obtained depend on a helical pitch of the helical structure obtained. This helical pitch length can be controlled by the kind and addition amount of the optically active compound. The optically active compound added may be single, and plural optically active compounds may be used for the purpose of offsetting a temperature dependency of the helical pitch. Polymerizable compounds other than the compound (1) in addition to the compound (1) and the optically active compound may be contained in the composition (1).

In selective reflection of visible light which is a characteristic of the optical isomer described above, a helical structure works on incident light to allow circularly polarized light and elliptically polarized light to be reflected. A selective reflection characteristic is shown by $\lambda = n \cdot \text{Pitch}$ ($\lambda$ is a selective reflection central wavelength; n is an average refraction index; and Pitch is a helical pitch), and therefore $\lambda$ and a band thereof ($\Delta\lambda$) can suitably be controlled by n or Pitch. $\Delta\lambda$ may be advisably decreased in order to improve a color purity, and Δλ may be advisably increased when reflection in a broad band is desired. Further, this selective reflection is influenced to a large extent by a cell thickness. In order to maintain the color purity, attentions have to be paid so that the cell thickness is not reduced too much. In order to maintain homogeneity in alignment, attentions have to be paid so that the cell thickness does not grow too large. Accordingly, the cell thickness has to be suitably controlled, and it is preferably approximately 0.5 to approximately 25 μm, more preferably approximately 0.5 to approximately 5 μm.

A negative type c-plate described in W. H. de Jeu, PHYSICAL PROPERTIES OF LIQUID CRYSTALLINE MATERIALS, Gordon and Breach, New York (1980) can be prepared by making a helical pitch further shorter than that of visible light. Shortening of the helical pitch can be achieved by using an optically active compound having a large helical twisting power (HTP) and increasing an addition amount thereof. To be specific, the negative type c-plate can be prepared by controlling λ to approximately 350 nm or less, preferably approximately 200 nm or less. This negative type c-plate becomes an optical compensator suited to display elements of a VAN type, a VAC type and an OCB type out of liquid crystal display elements.

Any optically active compounds may be used for the optically active compound described above as long as they induce a helical structure and can suitably be mixed with the polymerizable liquid crystal composition which is the base. Either of the polymerizable compound and the non-polymerizable compound may be used, and the optimum compound can be added according to the purposes. Considering the heat resistance and the solvent resistance, the polymerizable compound is suited. Further, the optically active compound having a large helical twisting power (HTP) described above is suited in terms of shortening the helical pitch. The representative examples of the optically active compound having a large helical twisting power (HTP) are disclosed in GB2298202 and DE10221751.

Optically active compounds (Op-1) to (Op-19) shown below are suited as the optically active compound described above, and the compounds (Op-14) to (Op-19) are particularly suited. In the formulas, $R^c$ represents polymerizable or non-polymerizable alkyl or alkoxy having a carbon number of approximately 1 to approximately 10, and a $CH_3$ group at the chain end may be substituted with $-OCOCH=CH_2$. Plural $R^c$ may be the same or different. Carbon affixed with "*" is asymmetric carbon.

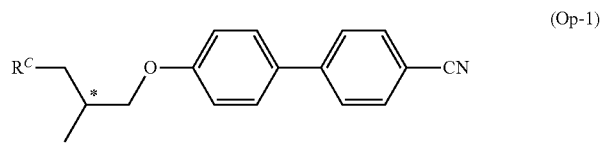
(Op-1)

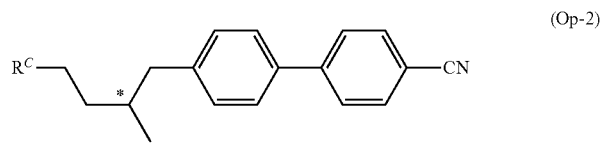
(Op-2)

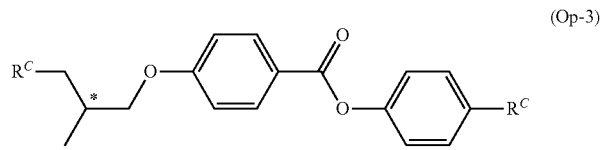
(Op-3)

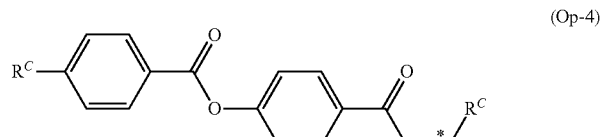
(Op-4)

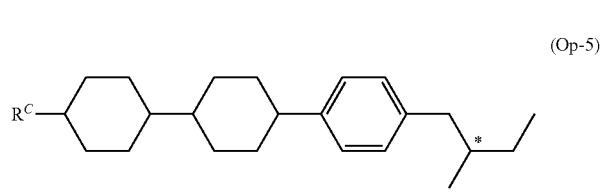
(Op-5)

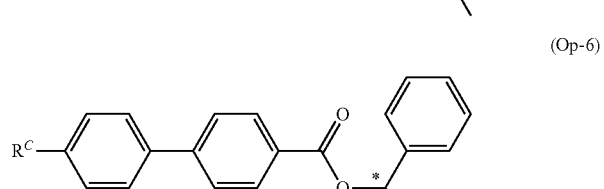
(Op-6)

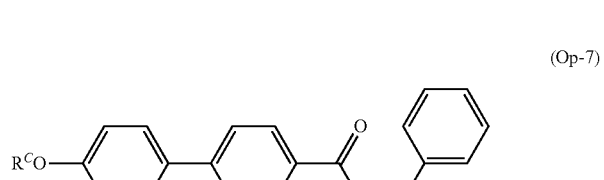
(Op-7)

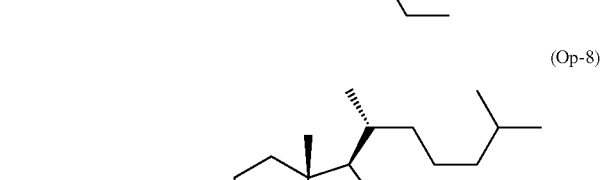
(Op-8)

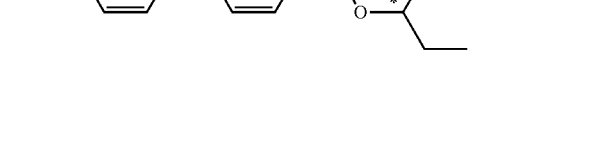
(Op-9)

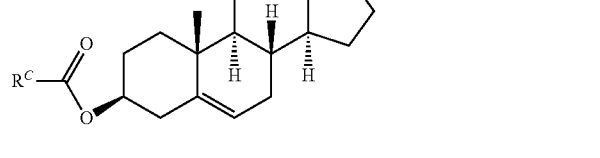
(Op-10)

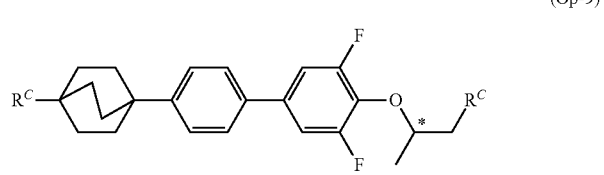

-continued
(Op-11)
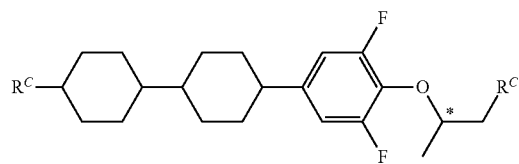
(Op-12)
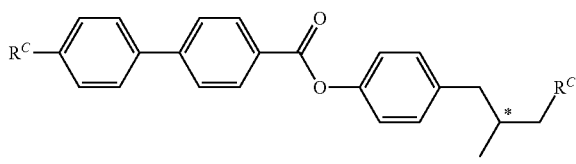
(Op-13)
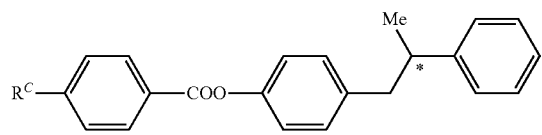
(Op-14)
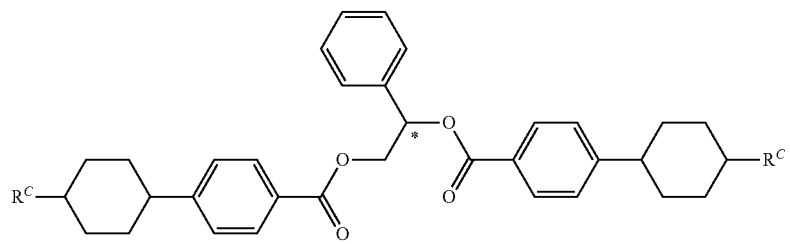
(Op-15)
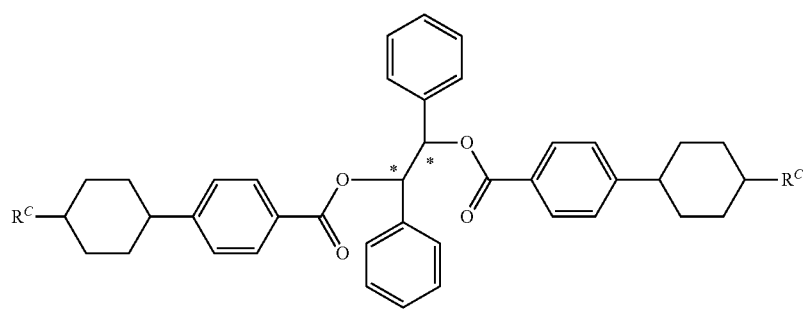
(Op-16)
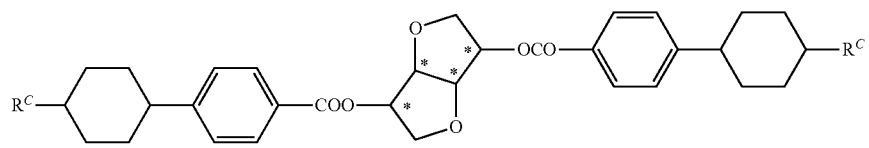
(Op-17)
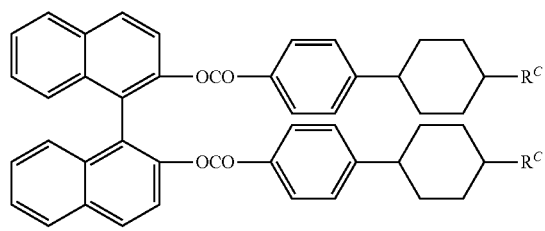
(Op-18)
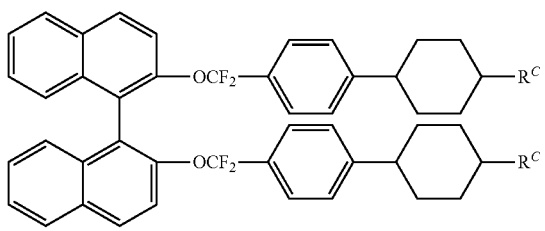
(Op-19)
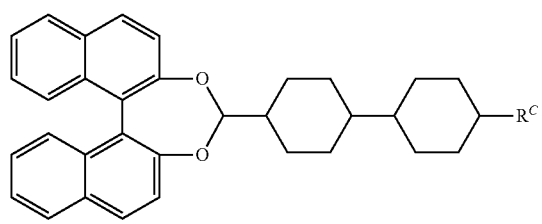

4. Polymerization Initiator

The composition (1) may contain a polymerization initiator. Preferred polymerization initiators for optical radical polymerization include, for example, 2-hydroxy-2-methyl-1-phenylpropane-1-one (trade name: Darocure 1173®), 1-hydroxycyclohexyl phenyl ketone (trade name: Irgacure 184®), 2,2-dimethoxy-1,2-diphenylethane-1-one (trade name: Irgacure 651®), Irgacure 500®, Irgacure 2959®, Irgacure 907®, Irgacure 369®, Irgacure 1300®, Irgacure 819®, Irgacure 1700®, Irgacure 1800®, Irgacure 1850®, Darocure 4265®, Irgacure 784®, p-methoxyphenyl-2,4-bis(trichloromethyl)triazine, 2-(p-butoxystyryl)-5-trichloromethyl-1,3,4-oxadiazole, 9-phenylacridine, 1-(4-isopropylphenyl)-2-hydroxy-2-methylpropane-1-one, benzyl dimethyl ketal and a 2-methyl-1-[4-(methylthio)phenyl]-2-morpholinopropane-1,2,4-diethylxanthone/methyl p-dimethylaminobenzoate mixture.

Preferred polymerization initiators for thermal radical polymerization include, for example, benzoyl peroxide, diisopropylperoxy dicarbonate, t-butylperoxy 2-ethylhexanoate, t-butylperoxy pivalate, di-t-butyl peroxide (DTBPO), t-butylperoxy diisobutyrate, lauroyl peroxide, dimethyl 2,2'-azobisisobutyrate (MAIB), azobisisobutyronitrile (AIBN) and azobiscyclohexanecarbonitrile (ACAN).

Preferred initiators for anionic polymerization, coordination polymerization and living polymerization include, for example, alkali metal alkyl such as n-$C_4H_9Li$ and t-$C_4H_9Li$-$R_3Al$, aluminum compounds and transition metal compounds.

5. Solvent

The composition (1) may contain a solvent. The composition (1) may be polymerized in a solvent or in the absence of a solvent. When an aligned film, an anti-reflection film and a viewing angle compensator are produced by photopolymerization, the composition (1) containing a solvent is coated on a substrate, and the solvent is removed. Then, it may be polymerized by irradiating with light.

Preferred solvents include, for example, benzene, toluene, xylene, mesitylene, hexane, heptane, octane, nonane, decane, tetrahydrofuran, γ-butyrolactone, N-methylpyrrolidone, dimethyl formamide, dimethylsulfoxide, cyclohexane, methylcyclohexane, cyclopentanone, cyclohexanone and PGMEA. The solvent may be used alone or in a mixture of two or more kinds thereof.

The composition can be coated on the substrate by means of a publicly known coater (e.g., a doctor blade, a coating apparatus and the like). It is not so meaningful to restrict a use proportion of the solvent in polymerization. Considering the polymerization efficiency, the solvent cost, the energy cost and the like, it may be determined by individual case.

6. Surfactant

The composition (1) may contain a surfactant. The surfactant facilitates coating of the composition on a supporting substrate and controls alignment of the liquid crystal phase. Preferred surfactants include, for example, quaternary ammonium salts, alkylamine oxide, polyamine derivatives, polyoxyethylene-polyoxypropylene condensation products, polyethylene glycol and esters thereof, sodium laurylsulfate, ammonium laurylsulfate, amines laurylsulfate, alkyl-substituted aromatic sulfonic acid salts, alkylphosphoric acid salts, perfluoroalkylsulfonic acid salts, perfluoroalkylcarboxylic acid salts, perfluoroalkyl ethylene oxide adducts and perfluoroalkyl trimethylammonium salts. The amount of the surfactant is varied according to the kind of the surfactant and a composition ratio of the composition, and it falls in a range of from approximately 100 ppm to approximately 5% by weight, preferably from approximately 0.1 to approximately 1% by weight based on the weight of the whole composition (1) (excluding the solvent).

7. Antioxidant

The composition (1) may contain an antioxidant. The composition (1) has a high polymerizability, and therefore the antioxidant makes it easy to handle. Preferred antioxidants include, for example, hydroquinone, 2,6-di-t-butyl-p-cresol, 2,6-di-t-butylphenol, triphenyl phosphite and trialkyl phosphite, and the preferred commercially available products include Irganox 245® and Irganox 1035® each manufactured by Ciba Specialty Chemicals Co., Ltd.

8. UV absorber

The composition (1) may contain a UV absorber. The composition (1) has a high polymerizability, and therefore the storage stability is enhanced by the UV absorber. Preferred UV absorbers include, for example, Tinuvin PS®, Tinuvin 213®, Tinuvin 109®, Tinuvin 328®, Tinuvin 384-2® and Tinuvin 327® each manufactured by Ciba Specialty Chemicals Co., Ltd.

Polymer

The polymer of the invention is obtained by polymerizing the composition (1) containing at least one compound (1). This polymer shall be shown as the polymer (1). The polymer (1) of the invention has characteristics such as good optical anisotropy, high transparency, good chemical stability, good heat resistance, low water absorbing property, low gas permeating property, good hardness and good mechanical strength. The mechanical strength described above includes a Young's modulus, a tensile strength, a tearing strength, a flexural strength, a flexural elastic modulus and an impact strength. The polymer (1) has a structural unit derived from the compound (1).

The kind of the polymerizations include radical polymerization, anionic polymerization, cationic polymerization and coordination polymerization. Preferred reaction temperatures fall in the range of from approximately 0 to approximately 150° C., and the preferred reaction time is from approximately 1 to approximately 100 hours. The kind of the polymer obtained includes a homopolymer, a random copolymer, an alternating copolymer, a block copolymer and a graft copolymer. The polymerization method and the polymer which are suited to the uses are preferably selected.

The polymer (1) is a thermoplastic resin or a thermosetting resin. The weight average molecular weight of the thermoplastic resin falls in the range of preferably from approximately 500 to approximately 1,000,000, more preferably from approximately 1,000 to approximately 500,000 and particularly preferably from approximately 5,000 to approximately 100,000. Such polymer (1) is soluble in a solvent, and therefore it is readily molded into a shape suited to uses. For obtaining the thermoplastic resin, the compound (1) may be used alone or in combination with other polymerizable compounds having a polymerizable group at a single end. On the other hand, when a compound having a polymerizable group at both ends is used as the other polymerizable compound, a thermosetting resin is liable to be obtained. The thermosetting resin has a three-dimensional cross-linked structure. Such polymer (1) is insoluble in a solvent, and therefore the molecular weight can not be measured. When the composition of the invention is coated on a substrate and polymerized to fix alignment of the molecules to thereby obtain an optical anisotropy, it is not further processed, so that the size of the molecular weight is out of the question, and the conditions may advisably be satisfied in the use environment.

A cross-linking agent may be added in order to enhance more the molecular weight. A molecular weight of the polymer obtained is infinitely enlarged by adding the cross-linking agent, and a polymer that exhibits excellent chemical resistance and heat resistance can be obtained. Any compounds can be used as the cross-linking agent as long as they are publicly known to persons having an ordinary skill in the art, and includes, for example, tris(3-mercaptopropionate) and the like.

The polymer (1) of the invention can be used in the forms of a film, a fiber, a molded article and the like. The preferred form is a film. The film is obtained by a method in which the composition (1) is coated on a substrate and polymerized, a method in which a solution of the polymer (1) is coated on an aligned substrate and in which the solvent is removed and a method in which the polymer (1) is subjected to press molding. A thickness of the polymer is varied according to a value of the optical anisotropy of the polymer and the uses, and therefore the range thereof can not strictly be determined. The thickness falls, for example, in a range of from approximately 0.05 to approximately 50 μm, preferably from approximately 0.1 to approximately 20 μm and more preferably from approximately 0.5 to approximately 10 μm.

When an optically anisotropic thin film is formed on a substrate, any substrates can suitably be used as long as they are publicly known to persons having an ordinary skill in the art. They include, for example, glass, polyesters such as polyethylene terephthalate (PET), polyvinyl alcohol (PVA), polycarbonate (PC), triacetyl cellulose (TAC) and norbornene base polymers. The commercially available products include, for example, Zeonoa® and Zeonex® each manufactured by Zeon Corporation and Arton® manufactured by JSR Co., Ltd. The polymer (1) of the invention exhibits excellent adhesion to the above substrates.

The classification of alignment in the invention includes homogeneous (parallel), homeotropic (vertical), hybrid, tilt and twist. Homogeneous alignment indicates a situation in which an aligned vector is parallel to a substrate and stays in a single direction. Homeotropic alignment indicates a situation in which an aligned vector is vertical to a substrate. Hybrid alignment indicates a situation in which an aligned vector stands up vertically from parallel as it gets away from a substrate. Tilt alignment indicates a situation in which an aligned vector rises up in a constant tilt angle to a substrate. These alignments are observed in compounds and compositions each having a nematic phase and the like. On the other hand, twist alignment is observed in compositions having a chiral nematic phase, a cholesteric phase and the like. Twist alignment means a situation in which an aligned vector is parallel to a substrate but twisted little by little as it gets away from the substrate. This twist is produced by an action of an optically active group.

The alignment of the composition (1) on the substrate can be obtained, for example, by subjecting an aligned film coated on the substrate to a rubbing treatment and coating the composition (1) thereon. The purpose can be achieved even if any of aligned films publicly known to persons having an ordinary skill in the art is used as long as the alignment can be controlled. Polyimide, polyamide and polyvinyl alcohol base aligned films are suited. Further, alignment can be obtained as well by rubbing the substrate itself with a rubbing cloth and then coating the composition (1) directly thereon. In the homeotropic alignment, rubbing is not necessarily required in a certain case. The aligned composition is polymerized by irradiation with light to provide an optical isomer, and therefore it is an industrially advantageous method.

The polymer (1) is provided with an optical anisotropy by fixing molecular arrangement. Such polymer is called an optical isomer. When the compound (1) is optically active, the polymer (1) is provided with a fixed helical structure. When the compound (1) is optically inactive, the polymer (1) having a fixed helical structure can be obtained by adding an optically active compound to this composition.

The polymer (1) in which both of molecular arrangement and a helical structure are fixed is suited to uses as, for example, a retardation film, a polarizing element, a circularly polarized light element, an elliptically polarized light element, an anti-reflection film, a selective reflection film, a color compensator, a viewing angle compensator and a liquid crystal alignment film. The polymer (1) in which molecular arrangement is fixed is suited to uses as, for example, a retardation film, a circularly polarized light element, an elliptically polarized light element, a selective reflection film, a color compensator and a viewing angle compensator. The polymer (1) in which the helical structure is fixed is suited to use as an anti-reflection film and a color compensator. The polymer (1) in which both of molecular arrangement and a helical structure are not fixed is suited to use as an anti-reflection film and a liquid crystal alignment film. In all cases, it can be used as well for adhesives, synthetic polymers having a mechanical anisotropy, cosmetics, ornamental articles, non-linear optical materials and information storage materials.

Heat polymerization and photopolymerization are suited for fixing molecular arrangement and helical structure. The heat polymerization is carried out preferably in the presence of a radical polymerization initiator. The photopolymerization is carried out preferably in the presence of an optical radical polymerization initiator. For example, a polymer in which molecules are arranged in the direction of polarization is obtained by a polymerization method in which a UV ray or an electron beam is irradiated in the presence of an optical radical polymerization initiator. Such polymer can be used for a liquid crystal alignment film without subjecting it to rubbing treatment.

A retardation film is obtained by polymerizing the composition containing the optically active compound (1). The retardation film is obtained as well by polymerizing the composition containing the optically inactive compound (1) and a suited amount of an optically active compound. These compositions are optically active and therefore have a helical structure. When these compositions are polymerized on a substrate subjected to aligning treatment, polymers in which the helical structure and molecular arrangement are fixed are obtained. The characteristics of the retardation film depend on the pitch in the helical structure. This helical pitch can be controlled by the kind and addition amount of the optically active compound. An addition amount thereof is usually from approximately 0.01 to approximately 50% by weight, preferably from approximately 1 to approximately 30% by weight based on the weight of the whole composition (excluding the solvent). The optically active compound may be single, and the plural optically active compounds may be added for the purpose of offsetting a temperature dependency of the helical pitch.

The polymer isolated is dissolve in a solvent and can be processed into a film and the like. Two kinds of the polymers may be mixed and processed, and the polymer may be laminated. Preferred solvents include, for example, N-methyl-2-pyrrolidone, dimethylsulfoxide, N,N-dimethylacetamide, N,N-dimethylformamide, N,N-dimethylacetamide dimethylacetal, tetrahydrofuran, chloroform, 1,4-dioxane, bis(methoxyethyl) ether, γ-butyrolactone, tetramethylurea, trifluoroacetic acid, ethyl trifluoroacetate, hexafluoro-2-propanol, 2-methoxyethyl acetate, methyl ethyl ketone, cyclopentanone and cyclohexanone. The above solvents may be use in a mixture with conventional organic solvents such as acetone, benzene, toluene, heptane and methylene chloride It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention shall more specifically be explained below with reference to examples, but the invention shall not be restricted by these examples.

The structures of the compounds were confirmed by a nuclear magnetic resonance spectrum, an infrared absorption spectrum, a mass spectrum and the like. The unit of phase transition temperature is ° C.; C represents crystal; N represents a nematic phase; and I represents an isotropic liquid phase. The measuring methods of the physical property values shall be shown below.

(1) Helical Pitch

The sample compound 1 part by weight was dissolved in the following composition (M-1) 99 parts by weight to prepare a composition, and the helical pitch was measured at 25° C. based on a wedge method of Cano (*Applied Physics*, 43, 125(1974)).

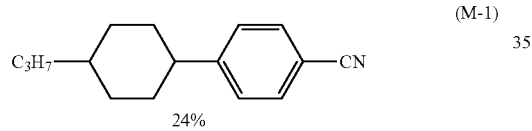

(M-1)

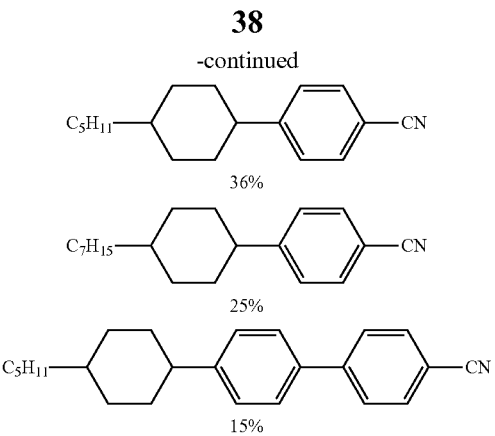

(2) Weight Average Molecular Weight and Number Average Molecular Weight

A "Shimadzu LC-9A type gel permeation chromatograph" manufactured by Shimadzu Corporation and a "Column Shodex GF-7M HQ" manufactured by Showa Denko K. K. were used to measure them in DMF which was a developing solvent.

(3) Pencil Hardness

Pencil hardness was measured according to a JIS standard "JIS-K-5400 8.4 pencil scratch test."

(4) Other

The characteristics such as a mechanical strength and the like were measured based on methods described in JIS standards.

Example 1

A compound (c-1) shown below was synthesized in the following manner.

-continued

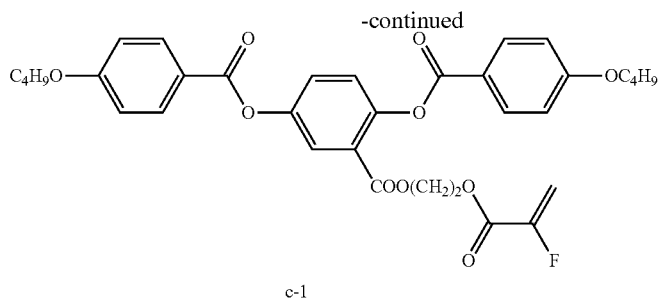

c-1

First Step

A compound (ex1-1) 25 mmol, 2-benzyloxyethanol 27 mmol and 4-dimethylaminopyridine (DMAP) 7 mmol were added to 75 mL of dichloromethane and stirred under nitrogen atmosphere. A dichloromethane 25 mL solution of 1,3-dicyclohexylcarbodiimide (DCC) 27 mmol was dropwise added thereto. After dropwise adding, the solution was stirred at room temperature for 10 hours. A precipitate deposited was filtered off, and the organic layer was washed with water and dried on anhydrous magnesium sulfate. The solvent was distilled off under reduced pressure, and the residue was refined by column chromatography and recrystallized from ethanol, whereby a compound (ex1-2) 18 mmol was obtained.

Second Step

The compound (ex1-2) 18 mmol and 5%-Pd/C 0.5 g were added to ethyl acetate and stirred at room temperature for 5 hours under hydrogen atmosphere. Pd/C was removed, and then recrystallization was carried out from heptane, whereby a compound (ex1-3) 15 mmol was obtained.

Third Step

An N,N-dimethylformamide (DMF) 45 mL solution of the compound (ex1-3) 15 mmol was cooled to −20° C. under nitrogen atmosphere. A DMF 20 mL solution of α-fluoroacrylic acid fluoride 45 mmol was dropwise added thereto. The solution was stirred at room temperature for 18 hours, and water was added thereto, followed by extracting the solution with toluene. The organic layer was washed water and dried on anhydrous magnesium sulfate. The solvent was distilled off under reduced pressure, and the residue was refined by column chromatography and recrystallization from ethanol to obtain the intended compound (c-1) 11 mmol.

A phase transition temperature, an NMR measuring data and a melting point of the compound (c-1) are shown below.

Phase transition temperature: C 89.8 N 96.4 I; $^{1}$H-NMR (CDCl$_3$): 1.00 (t, 6H), 1.48 to 1.57 (m, 4H), 1.79 to 1.85 (m, 4H), 4.04 to 4.08 (m, 4H), 4.26 to 4.29 (m, 2H), 4.43 to 4.46 (m, 2H), 5.33 (d, d, 1H), 5.66 (d, d, 1H), 6.98 (d, 4H), 7.28 (d, 1H), 7.49 (d, d, 1H), 7.92 (d, 1H), 8.15 (d, 4H); $^{19}$F-NMR (CDCl$_3$): −117.73 (d, d, 1F).

Example 2

A photopolymerization initiator Irgacure 907® (manufactured by Ciba Specialty Chemicals Co., Ltd.) 3 parts by weight was added to a composition comprising the compound (c-1) 25 parts by weight produced in Example 1, 1,4-bis(4-(6-acryloyloxyhexyloxy)benzoyloxy)benzene 45 parts by weight and 4-(trans-4-propylcyclohexyl)-cyanobenzene 27 parts by weight. The above polymerizable composition 100 parts by weight containing the photopolymerization initiator was dissolved in cyclopentanone 200 parts by weight to prepare a solution having a concentration of approximately 33% by weight. This solution was coated on a glass substrate having a polyimide aligned film subjected to rubbing treatment by means of a bar coater while controlling so that a thickness of the solution was about 12 μm. Then, this glass substrate was put on a hot plate heated at 70° C. for 120 seconds to vaporize the solvent. Molecular alignment was expected to be fixed by the above operation.

Next, the composition was irradiated with light having an intensity of 30 mW/cm$^2$ (central wavelength: 365 nm) for 20 seconds under nitrogen atmosphere by means of an extra high mercury lamp of 250 W while heating on a hot plate at 70° C. to polymerize it. A film thus obtained was observed under a polarizing microscope cross nicols while rotating clockwise a polarizer and an analyzer to find that light and darkness were turned round by every 45°, so that the homogeneous alignment was confirmed.

Example 3

The compound (c-1) 10 mg produced in Example 1, azobiscyclohexanecarbonitrile 0.1 mg as a polymerization initiator and benzene 100 μL were put in an ampul of glass. This was cooled to −60° C. and sufficiently deaerated by means of a vacuum pump, and then it was sealed. This ampul was heated at 110° C. for 24 hours. The resulting reaction mixture was reprecipitated three times from 15 mL of methanol to obtain 6.8 mg of a polymer.

The polymer thus obtained had a weight average molecular weight (Mw) of 25,000 measured by GPC and a dispersibility (Mw/Mn) of 2.01. The polymer 1.378 mg was dipped in 1 mL of purified water and left standing at 50° C. for 10 days, and then the polymer was taken out, dried well and measured for a weight to find that it was 1.385 mg. It was confirmed from this measurement that the polymer obtained had a low water absorption coefficient.

Example 4

The polymer 5 parts by weight produced in Example 3 was dissolved in NMP 100 parts by weight. This solution was coated on two plates of a glass substrate which was sufficiently washed in advance by means of a spin coater. These glass substrates were heated at 200° C. for 3 hours to remove the solvent, whereby a thin film of the polymer was formed on the glass substrate. The surfaces of the thin films of the polymer formed on the above glass substrates were rubbed in a single direction by means of a roller equipped with a rubbing cloth and subjected to rubbing treatment. Two plates of the above glass substrates were stuck together via spacers having a thickness of 10 μm with the thin films of the polymer being opposite to each other so that the rubbing directions were the same, whereby a cell was prepared. A liquid crystal composition ZLI-1132® manufactured by Merck Co., Ltd. was injected into the above cell at room temperature. The liquid crystal composition in the liquid crystal cell showed even homogeneous alignment.

COMPOSITION EXAMPLES

The suitable examples of compositions which can be prepared using the compounds (1) of the invention shall be shown below as Composition Example 1 to Composition Example 6. All compositions were polymerized by irradiation with a UV ray to provide polymers having an optical anisotropy. Percentage (%) in the following examples shows % by weight.

Composition Example 1

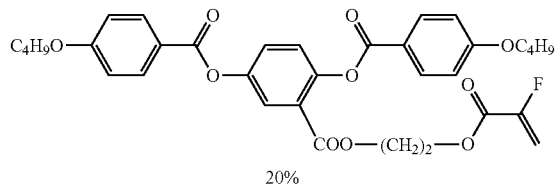

20%

-continued

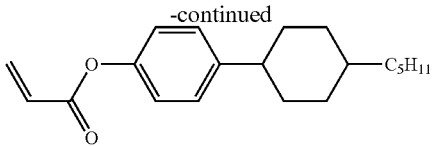

30%

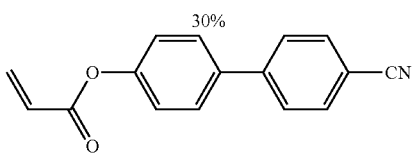

30%

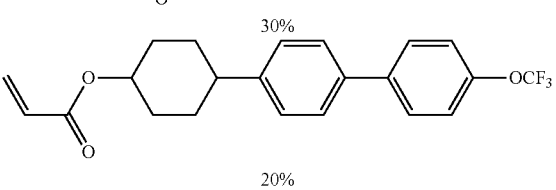

20%

Composition Example 2

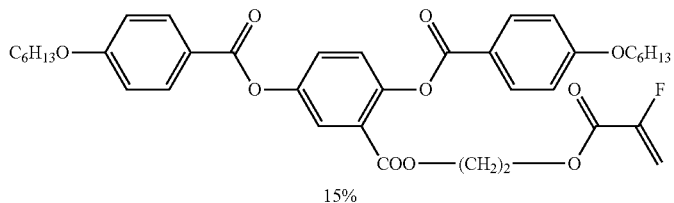

15%

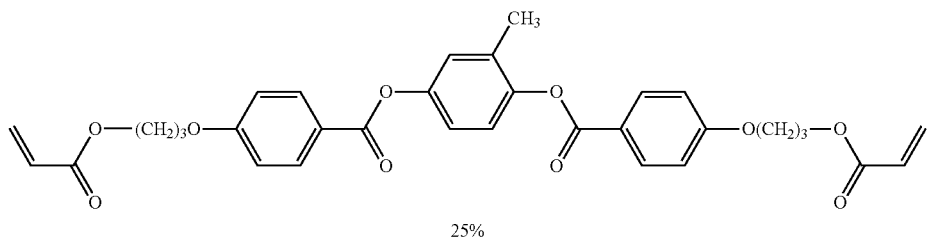

25%

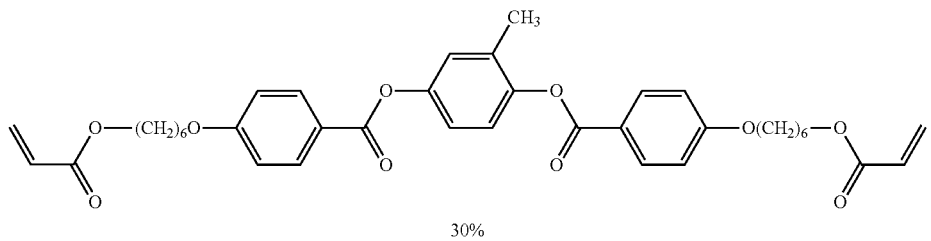

30%

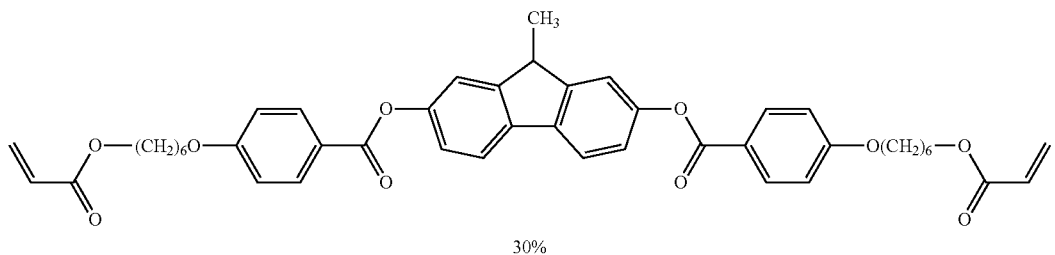

30%

Composition Example 3
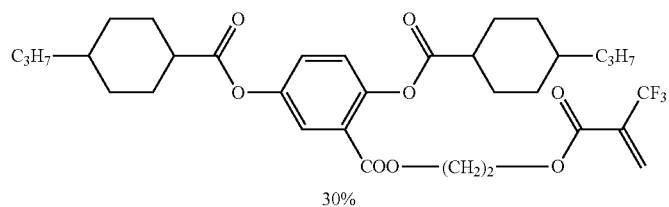
30%
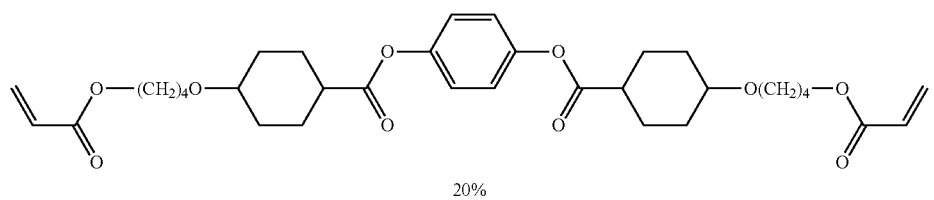
20%
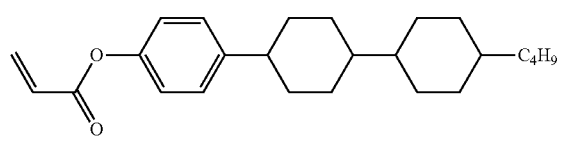
20%
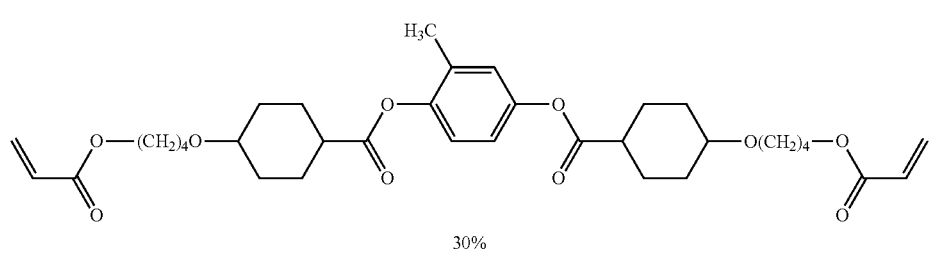
30%
Composition Example 4
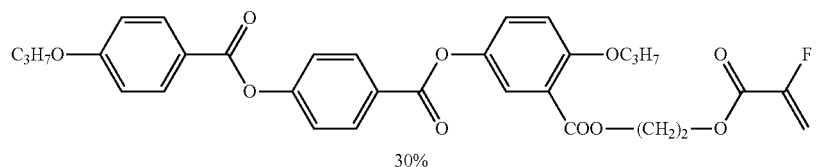
30%
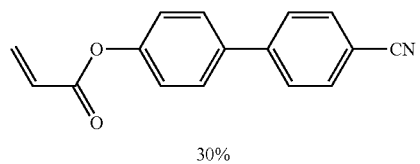
30%
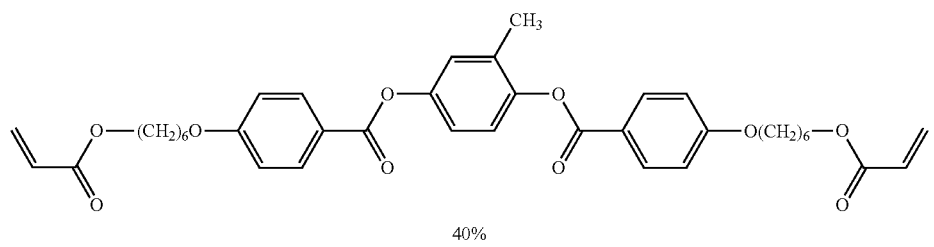
40%

Composition Example 5
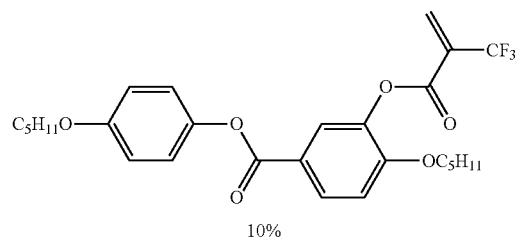
10%
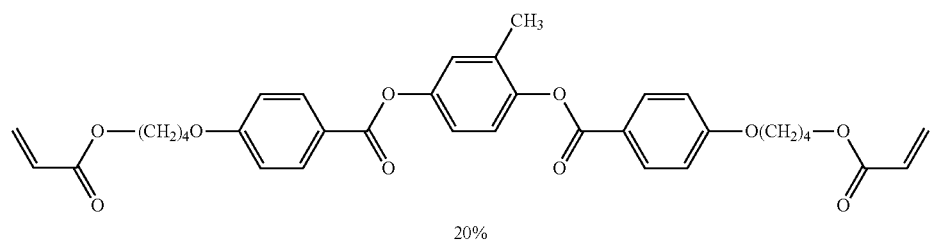
20%
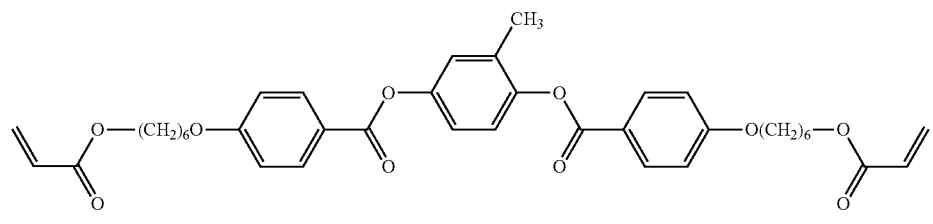
40%
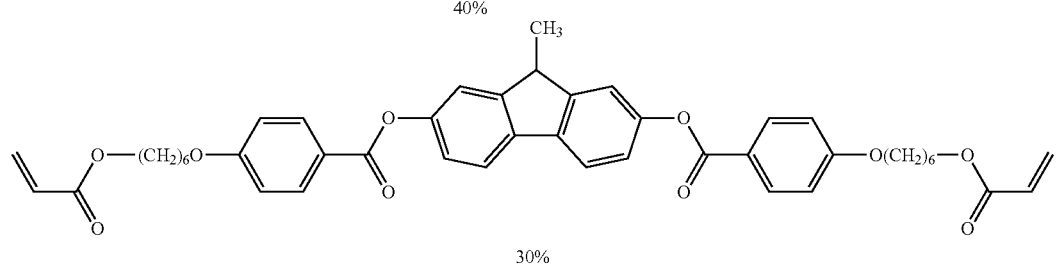
30%
Composition Example 6
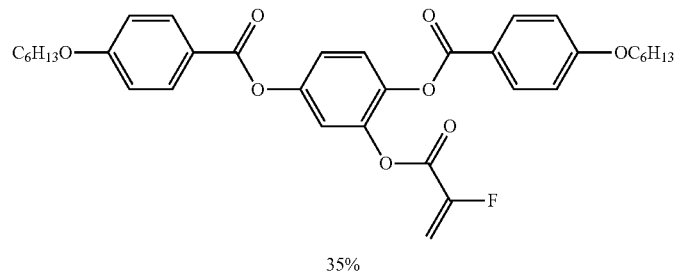
35%
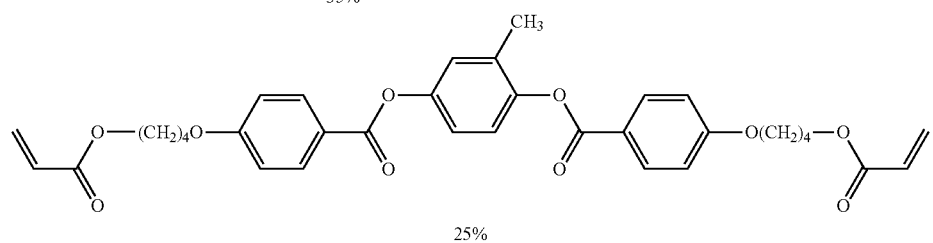
25%

-continued

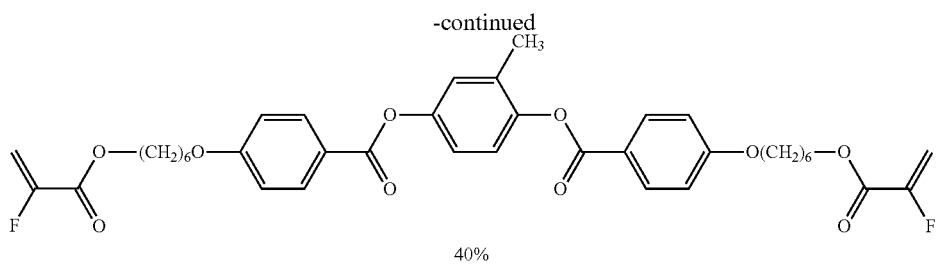

40%

The composition of the invention has applicability as a liquid crystal composition for a liquid crystal display element. The polymer of the invention has applicability to, for example, a retardation film, a polarizing element, a circularly polarized light element, an elliptically polarized light element, an anti-reflection film, a selective reflection film, a color compensator, a viewing angle compensator, a liquid crystal alignment film and an adhesive.

What is claimed is:

1. A polymer obtained by polymerizing a composition comprising at least one compound represented by Formula (1):

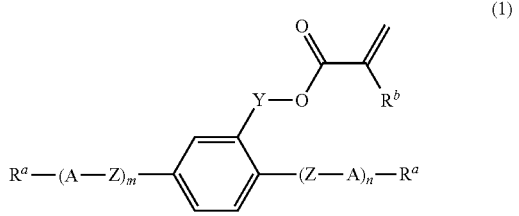

(1)

wherein in Formula (1),
$R^a$ is independently halogen, cyano, —$CF_3$, —$CF_2H$, —$CFH_2$, —$OCF_3$, —$OCF_2H$, —N=C=O, —N=C=S or alkyl having a carbon number of approximately 1 to approximately 20; in the alkyl, optional —$CH_2$— may be substituted with —O—, —S—, —$SO_2$—, —CO—, —COO—, —OCO—, —CH=CH—, —CF=CF— or —C≡C—, and optional hydrogen may be substituted with halogen;
$R^b$ is fluorine or —$CF_3$;
A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —$CH_2$— may be substituted with —O—, optional —CH= may be substituted with —N=, and optional hydrogen may be substituted with halogen, alkyl having a carbon number of approximately 1 to approximately 5 or halogenated alkyl having a carbon number of approximately 1 to approximately 5;
Z is independently a single bond or alkylene having a carbon number of approximately 1 to approximately 20; in the alkylene, optional —$CH_2$— may be substituted with —O—, —CO—, —COO—, —OCO—, —CH=CH—, —CF=CF— or —C≡C—, and optional hydrogen may be substituted with halogen;
Y is a single bond or alkylene having a carbon number of approximately 1 to approximately 20; in the alkylene, optional —$CH_2$— may be substituted with —O—, —CO—, —COO—, —OCO— or —CH=CH—, and optional hydrogen may be substituted with halogen; and m and n are each an integer of approximately 0 to approximately 5, wherein m and n are not 0 at the same time.

2. The polymer of claim 1, wherein the weight average molecular weight of said polymer is approximately 500 to approximately 1,000,000.

3. The polymer of claim 1, wherein the weight average molecular weight of said polymer is approximately 1,000 to approximately 500,000.

4. The polymer of claim 1, wherein said polymer is optically active.

5. A film comprising the polymer of claim 1.

6. A molded article having an optical anisotropy comprising the polymer of claim 1.

7. A liquid crystal display element comprising a compound represented by Formula (1):

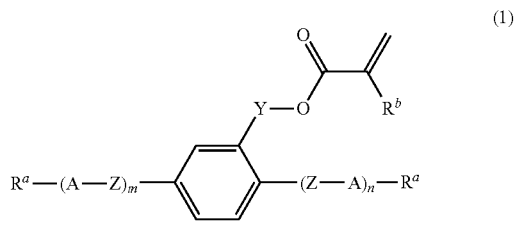

(1)

wherein in Formula (1),
$R^a$ is independently halogen, cyano, —$CF_3$, —$CF_2H$, —$CFH_2$, —$OCF_3$, —$OCF_2H$, —N=C=O, —N=C=S or alkyl having a carbon number of approximately 1 to approximately 20; in the alkyl, optional —$CH_2$— may be substituted with —O—, —S—, —$SO_2$—, —CO—, —COO—, —OCO—, —CH=CH—, —CF=CF— or —C≡C—, and optional hydrogen may be substituted with halogen;
$R^b$ is fluorine or —$CF_3$;
A is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl; in these rings, optional —$CH_2$— may be substituted with —O—, optional —CH= may be substituted with —N=, and optional hydrogen may be substituted with halogen, alkyl having a carbon number of approximately 1 to approximately 5 or halogenated alkyl having a carbon number of approximately 1 to approximately 5;
Z is independently a single bond or alkylene having a carbon number of approximately 1 to approximately 20; in the alkylene, optional —$CH_2$— may be substituted with —O—, —CO—, —COO—, —OCO—, —CH=CH—, —CF=CF— or —C≡C—, and optional hydrogen may be substituted with halogen;

Y is a single bond or alkylene having a carbon number of approximately 1 to approximately 20; in the alkylene, optional —CH$_2$— may be substituted with —O—, —CO—, —COO—, —OCO— or —CH═CH—, and optional hydrogen may be substituted with halogen; and m and n are each an integer of approximately 0 to approximately 5, wherein m and n are not 0 at the same time.

8. A liquid crystal display element comprising the polymer of claim 1.

9. A liquid crystal display element comprising the film of claim 5.

10. A liquid crystal display element comprising the molded article having an optical anisotropy of claim 6.

* * * * *